United States Patent
Minamida et al.

(10) Patent No.: US 6,770,840 B2
(45) Date of Patent: Aug. 3, 2004

(54) METHOD OF BUTT-WELDING HOT-ROLLED STEEL MATERIALS BY LASER BEAM AND APPARATUS THEREFOR

(75) Inventors: Katsuhiro Minamida, Futtsu (JP); Hiroyuki Yamamoto, Futtsu (JP); Motoi Kido, Futtsu (JP)

(73) Assignee: Nippon Steel Corporation, Tokyo (JP)

(*) Notice: Subject to any disclaimer, the term of this patent is extended or adjusted under 35 U.S.C. 154(b) by 113 days.

(21) Appl. No.: 10/254,330

(22) Filed: Sep. 25, 2002

(65) Prior Publication Data

US 2003/0038120 A1 Feb. 27, 2003

Related U.S. Application Data

(62) Division of application No. 09/382,000, filed as application No. PCT/JP98/01364 on Mar. 26, 1998, now abandoned.

(30) Foreign Application Priority Data

| Mar. 28, 1997 | (JP) | ............................................. 9-76869 |
| Mar. 28, 1997 | (JP) | ............................................. 9-76870 |
| Mar. 28, 1997 | (JP) | ............................................. 9-76871 |
| Mar. 31, 1997 | (JP) | ............................................. 9-79288 |

(51) Int. Cl.⁷ .......................................... B23K 26/00
(52) U.S. Cl. .............................. 219/121.64; 219/121.85
(58) Field of Search .................. 219/121.64, 121.85, 219/121.63, 121.65, 121.66

(56) References Cited

U.S. PATENT DOCUMENTS

| 4,377,735 A |   | 3/1983  | Minamida et al. ... 219/121.1 M |
| 4,626,651 A | * | 12/1986 | Taniguchi et al. ..... 219/121.63 |
| 4,634,832 A |   | 1/1987  | Martyr ................ 219/121.1 M |
| 5,190,204 A | * | 3/1993  | Jack et al. .................... 228/5.7 |
| 5,994,665 A | * | 11/1999 | Nishibayashi et al. . 219/121.64 |

FOREIGN PATENT DOCUMENTS

| JP | 58-184082 | 10/1983 |
| JP | 1-95887   | 4/1989  |
| JP | 6-182570  | 7/1994  |
| JP | 2-246484  | 9/1995  |
| JP | 8-257774  | 10/1996 |
| JP | 8-257776  | 10/1996 |
| JP | 8-300002  | 11/1996 |
| JP | 9-168878  | * 9/1997 ........... B23K/26/00 |

* cited by examiner

*Primary Examiner*—M. Alexandra Elve
(74) *Attorney, Agent, or Firm*—Kenyon & Kenyon

(57) ABSTRACT

In order to make the depth of penetration in the weld bead portion uniform and obtain a bead shape having a flat bottom without spiking and meltdown during continuous hot rolling by bonding a plurality of hot-rolled steel materials using a laser beam, the following methods are employed: (A) a method of butt welding wherein center gas is blown against the welding portion symmetrically to the optical axis of the laser beam while side gas is being blown thereagainst from the side, the method comprising conducting welding while the center of laser-induced plasma is shifted in the welding direction from the center of the laser beam by a distance 0.2 to 0.5 times as much as a reference plasma diameter determined from the laser output and the beam diameter, and the type and flow rate of the center gas; or (B) a method comprising scanning the butt line with the laser beam during the laser welding at a speed of 2 to 10 m/min, and simultaneously oscillating the laser beam in the direction vertical to the butt line at a frequency of 40 to 80 Hz at an amplitude of 0.4 to 1.0 mm. Alternatively, (C) in order to prevent formation of blow holes in the weld bead, to make the depth of penetration in the weld bead portion uniform, and to obtain a bead shape having a flat bottom without spiking and excessive penetration, laser welding is conducted while a filler wire of an iron series base material, containing from 0.05 to 3% of one or at least two elements selected from aluminum, silicon, titanium and manganese, is being supplied to the welding portion. Moreover, (D) in order to stably supply a filler wire to the butt portion with high supply accuracy, the filler wire W is passed through a wire supply nozzle having a curved portion, and the filler wire is supplied toward the welding point along the welding line.

5 Claims, 16 Drawing Sheets

Fig. 5
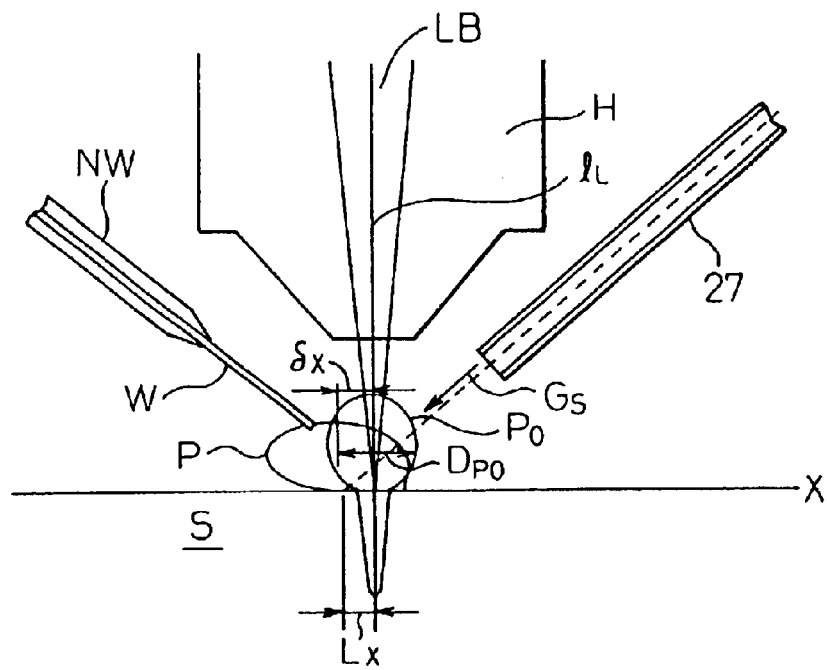
Fig. 6
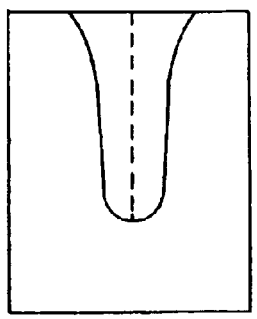
(1) TRANSVERSE CROSS-SECTION OF WELD BEAD
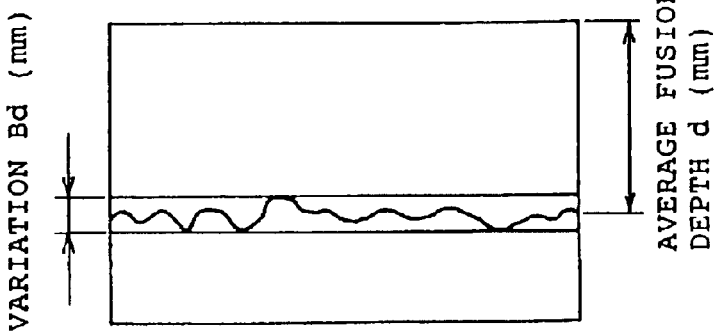
(2) LONGITUDINAL CROSS-SECTION OF WELD BEAD (a)

(b)

Fig.13
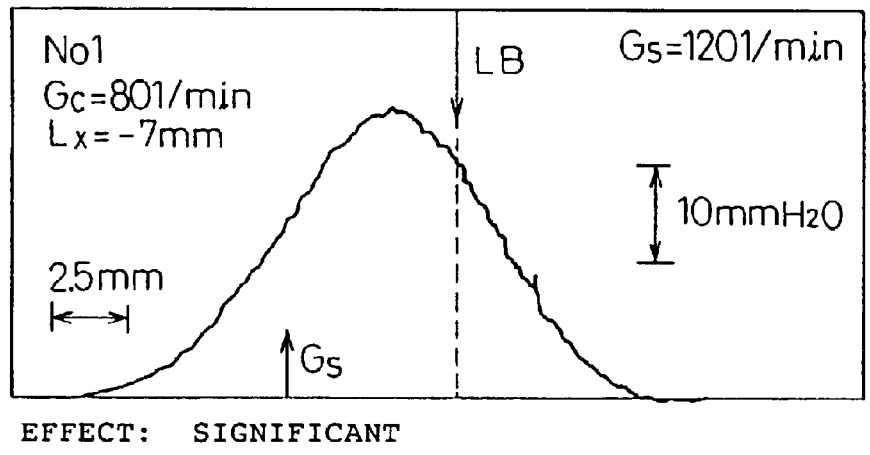
(a) EFFECT: SIGNIFICANT
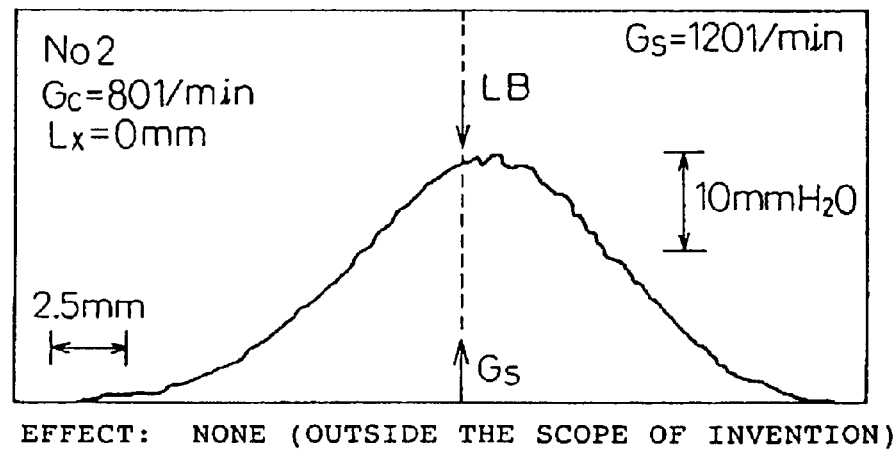
(b) EFFECT: NONE (OUTSIDE THE SCOPE OF INVENTION)
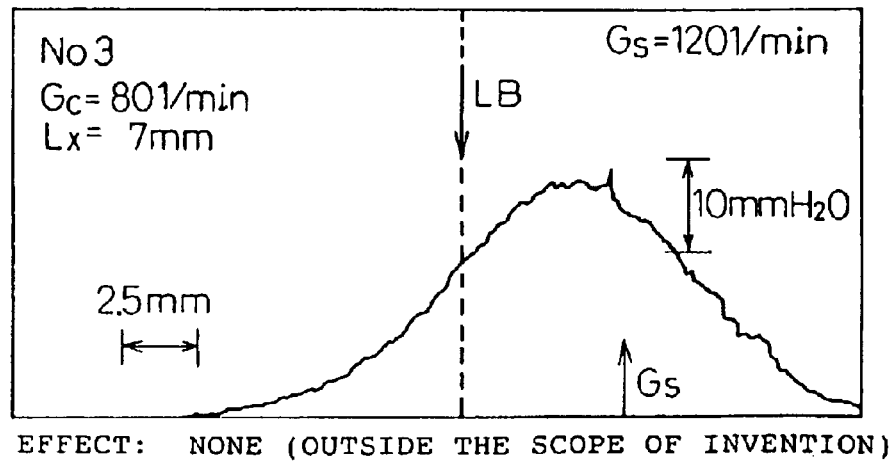
(c) EFFECT: NONE (OUTSIDE THE SCOPE OF INVENTION)

Fig. 24
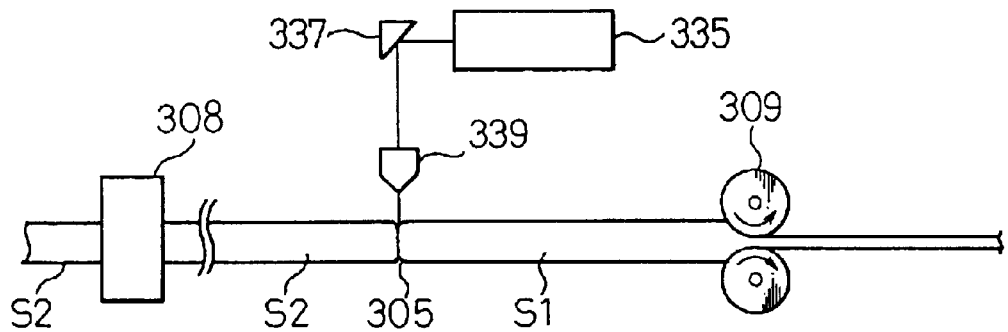
Fig. 25
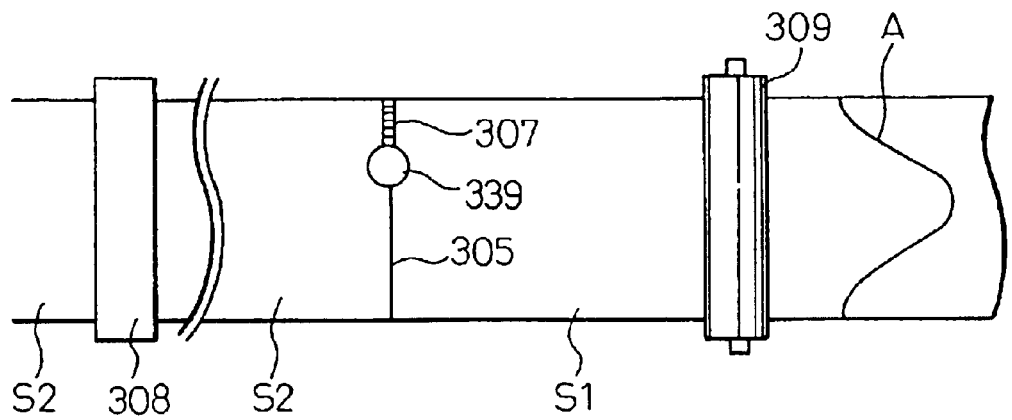
Fig. 26
(a)
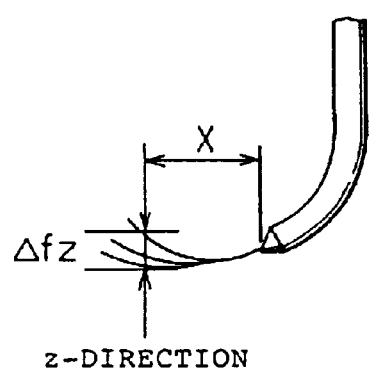
z-DIRECTION
(b)
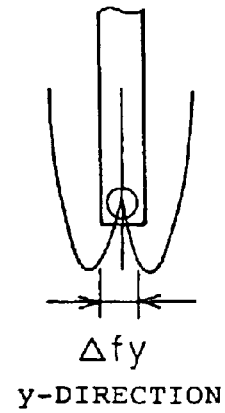
y-DIRECTION

METHOD OF BUTT-WELDING HOT-ROLLED STEEL MATERIALS BY LASER BEAM AND APPARATUS THEREFOR

This application is a divisional application under 35 U.S.C. §120 and §121 of prior application Ser. No. 09/382,000 filed Sep. 27, 1999 now abandoned which is a 35 U.S.C. §371 National Stage of International Application No. PCT/JP98/01364 filed Mar. 26, 1998, wherein International Application No. PCT/JP98/01364 was filed and published in the Japanese language.

TECHNICAL FIELD

The present invention relates to a method of butt-welding hot-rolled steel materials by a laser beam, during the production of a hot-rolled steel plate or a hot-rolled steel strip by continuously hot-rolling a steel material such as a slab or a sheet bar, and a welding nozzle, a filler wire supply nozzle and a welding apparatus.

BACKGROUND ART

In order to continuously hot-roll a steel material such as a slab or a sheet bar in a hot rolling line, the tail end of the preceding steel material has been butt-welded (tack welding) to the front end of the following steel material by a laser beam.

As shown in FIG. 1, the principle of a method of welding by a laser beam LB, which is a high energy beam, is to irradiate a workpiece S with a focused laser beam LB while a filler wire W is being supplied from a wire supply nozzle NW, thereby forming a keyhole K as a heat source which is a region having the highest energy density, and to scan the keyhole.

When the keyhole K which is a region where the metal is cylindrically evaporated is scanned, the peripheral molten region gradually solidifies as the laser beam LB passes to form a weld bead, and the workpiece S is butt-welded. The keyhole K is formed during laser welding by a balance between the vapor pressure and the force of gravity of the evaporated metal within the keyhole K. The evaporated metal generated on the keyhole K and the welding gas become a laser-induced plasma P. The mutual action of the laser-induced plasma P and the laser beam LB determines the energy incident on the workpiece S. The state of the mutual action of the laser beam LB and the plasma P changes momentarily, and the depth of penetration d increases and decreases in accordance with the change as shown in FIG. 2. When the amount of the plasma is increased, the laser beam LB is absorbed by the plasma, and the laser beam LB cannot reach the workpiece S, thereby decreasing the depth of penetration d. On the other hand, when the amount of the plasma is decreased, the laser beam LB easily reaches the workpiece S to cause spiking, thereby increasing the depth of penetration d temporarily. In particular, when welding is conducted by laser with an output as high as at least 25 kW, the size of the plasma becomes extremely large, and the variation ratio of the depth of penetration d becomes significant and as large as from 25 to 30%.

In laser welding hot-rolled steel materials in a hot rolling line, the hot-rolled steel materials have a high temperature, of at least 900° C., at the beginning. The metal is therefore easily heated to its boiling point by laser irradiation, and becomes a plasma; the mutual action of the laser beam and the laser-induced plasma is activated to repeat expansion and contraction of the plasma, thereby destabilizing a plasma generation region. As a result, spiking frequently occurs, and a variation in the depth of penetration increases. When the increase and decrease in the depth of penetration are significant, ensuring a bonding area ratio which is aimed at non-fracture of the joint during rolling becomes very difficult in cases where the steel materials are butt welded after shearing in continuous hot rolling. Moreover, for groove butt welding, when the depth of penetration d becomes excessive due to spiking, the molten metal flows down as shown in FIG. 2, that is, so-called meltdown MD takes place. As a result, there arises the possibility that the bonding area ratio falls (the portion R in FIG. 2).

Furthermore, WO. No. 94/6838 discloses a method of continuous hot rolling, which comprises butting the tail end of the preceding rolled material and the front end of the following rolled material against each other, and tack-welding the butted portions by a laser beam.

Although laser welding is suitable as tack welding in a hot rolling line in view of its high speed and its deep penetrating ability, it has the disadvantage of easily forming an offset. In order to overcome the disadvantage, Japanese Unexamined Patent Publication (Kokai) No. 8-257774 discloses a method of preventing an offset during tack-welding the butt portion with a laser beam, which comprises scanning the butt line with a laser beam at a speed of V while the laser beam is being oscillated in the direction vertical to the butt line at an average speed of v, wherein $1 \leq V/v \leq 2$, $5 \text{ m/min} \leq V \leq 20 \text{ m/min}$.

However, even the method mentioned above cannot solve the problems of spiking and generation of meltdown.

FIG. 3 shows a more detailed cross-sectional view of the laser irradiation point in tack welding with laser. When the butt portion of hot-rolled steel materials S is irradiated with a laser beam LB, a keyhole K is formed at the irradiation point. The keyhole K acts as a heat source, and a primary molten portion M1 is formed. On the other hand, the laser beam LB is multiply reflected in the interior of the keyhole K to converge to the lowest portion thereof and produce a spot-like heat source Q. A secondary molten portion M2 is formed, under the primary molten portion M1, by the spot-like heat source.

The properties of the spot-like heat source Q are not constant, but change in accordance with the internal shape of the keyhole K, the influence of evaporated metal having become plasma within the keyhole K, the heat output to the secondary molten portion M2, and the like. As a result, the depth of the secondary molten portion M2 partially increases so that spiking of the molten portion M or meltdown MD (FIG. 2) takes place.

Furthermore, in laser welding steel materials, when the base material S (FIG. 1) is a steel that contains metal elements such as Al, Si and Ti having deoxidizing effects in at least a given content, blow holes are hardly generated. However, when the content of a deoxidizing agent is low, blow holes are sometimes included in the weld zone. In particular, when high temperature materials are to be welded, for example, in a hot rolling line, scales (iron oxide) adhere to groove faces. When welding is conducted while the scales are being involved, blow holes are formed in the weld bead. The mechanism of the blow hole formation is as explained below: oxygen contained in the steel materials or the scales adhering to the steel material surface combines with carbon in the steel materials to form carbon monoxide in the melting step during welding, and the carbon monoxide is taken up in a bead in the solidifying step. The blow holes B in the weld bead WB not only lower the bonding strength of the hot-rolled steel materials S, but also relate to an increase and a decrease of a depth of penetration d as shown in FIG. 4; any of the blow holes can push a molten portion into the depth direction at the time of forming a carbon monoxide gas to temporarily increase the depth of penetration d by Δd. Spiking frequently takes place in accordance with the phenomena, and the variation in the depth of penetration Bd increases.

The ratio of the variation in the depth of penetration Bd to the average depth of penetration d as shown in FIG. 2 is defined as a variation ratio Bd/d. In the conventional laser welding method, the variation ratio Bd/d is about 20%.

As shown in FIG. 2, a margin A has heretofore been left as a countermeasure against the variation in the depth of penetration explained above and, particularly, against meltdown MD. For example, when the plate thickness of the hot-rolled steel materials is 35 mm, the effective thickness of the butt portion is 25 mm, and the margin A left becomes 5 mm when the depth of penetration is 20 mm.

A method has heretofore been adopted which is not aimed at welding the substantial effective butt thickness of a workpiece to secure a bonded area ratio but which is aimed at decreasing a variation in the depth of penetration by suppressing a total input energy for the hot-rolled steel materials by, for example, lowering the laser output, decreasing the welding speed, and the like procedure.

However, all these countermeasures are taken at the cost of the ability of deep penetration and the ability of high speed working which are advantages proper to laser welding, and they are unavoidably disadvantageous in view of the bonded area ratio or the productivity.

It is therefore required to make the depth of penetration in the weld bead portion uniform, and obtain a bead shape with a flat bottom without spiking and meltdown.

In butt-welding steel materials such as slabs and sheet bars, or metal strips, another important respect is supply of a filler wire.

That is, melting and mixing the filler wire and the base metal uniformly and in suitable amounts over the entire width of the strips have been very difficult for reasons explained below.

(1) Because a gap between groove faces of strips is as very narrow, from 0.05 to 2.00 mm, positional control of the filler wire is difficult.

(2) Because the focus diameter of the laser beam is as very small, from 0.1 to 0.8 mm, positional control of the filler wire is difficult as mentioned above.

(3) The filler wire is coiled on a reel or in a pail pack, and is uncoiled and supplied to the butt portion. As a result, complete straightening of the coiling set of the filler wire cannot be achieved by a filler supply nozzle having a linear shape. Positional control of the filler wire is therefore difficult, and moreover the coiling set changes as the filler wire is coiled.

For reasons explained above, the filler wire cannot be stably supplied to the butt portion and, as a result, lack of melting of the filler wire occurs, or the filler wire does not enter the gap of the butt portion, even when melted, to cause lack of fusion.

For example, when the supply position of the filler wire is higher than the intersection of the laser beam focused by a focusing lens and the strip surface in the gap of a butt portion of the preceding srip and the following strip, sufficient penetration cannot be obtained. Alternatively, even when the filler wire is supplied to the intersection, use of a filler wire having a significant coiling set results in insufficient penetration. As explained above, in conventional laser welding using a filler wire, a stabilized supply of the filler wire to the butt portion of the metal strips has been difficult, and no predetermined welding quality has been obtained (refer to Japanese Unexamined Patent Publication (Kokai) No. 61-56791).

FIG. 1 is a schematic view around a conventional welding head H using a straight wire supply nozzle NW. When such a straight wire supply nozzle NW is used, a filler wire W must be supplied toward a welding point from obliquely above the atmosphere of laser-induced plasma P generated during laser welding. Consequently, the filler wire W to be melted by the heat of the plasma P is melted in a position distant from the welding point and, as a result, destabilized and nonuniform penetration occurs. Because the filler wire tends to suffer from the thermal influence of the laser-induced plasma during welding, the filler wire must be supplied from a low position as close to the workpiece surface as possible so that the filler wire is melted in a position close to the welding point. When sensors, etc. are installed in a complicated combination near a welding torch in laser welding, the apparatus becomes large because the straight wire supply nozzle requires a space. In particular, in laser welding hot-rolled steel materials such as sheet bars and slabs at temperatures of at least 900° C., the assist gas nozzle and the wire supply nozzle are damaged by melting by radiation heat from the sheet bars, etc.; therefore, they cannot be made to approach the welding point closely. Accordingly, the projected length of the filler wire must be extended more than in the conventional welding procedures, and a higher supply accuracy is required.

Systems for supplying a filler wire to the wire supply nozzle, including the following ones, have heretofore been adopted (refer to Japanese Unexamined Patent Publication (Kokai) No. 6-87073): a push system wherein a wire feeder is provided to the wire reel side, and the filler wire is pushed out to the wire supply nozzle through a flexible conduit; a pull system wherein a wire feeder is provided to the wire supply nozzle side; a push-pull system wherein wire feeders are provided to both the wire reel side and the wire supply nozzle side, respectively; and a double push system wherein wire feeders are provided to the wire reel side and in the middle of the conduit, respectively.

In the wire supply apparatus of a laser beam welding machine, a wire feeder pulls out a filler wire coiled around a wire reel, and successively supplies the filler wire to a wire supply nozzle provided below the wire feeder through a conduit. Alternatively, the filler wire coiled around the wire reel is pulled out by the wire feeder, and is passed through the conduit via one roller leveler which straightens the coiling set formed in one direction alone by the wire reel. The filler wire is then successively supplied to a straight wire supply nozzle provided below the wire feeder. When a pail pack is used in place of the wire reel, the procedure is similar to that mentioned above; the roller leveler for straightening the coiling set of the filler wire is not been provided, or only one roller leveler if any is provided.

When the wire supply apparatus comprises a pail pack, a filler wire feeder and a filler wire supply nozzle, the coiling set of the filler wire formed within the pail pack and the twist deformation of the filler wire formed when the filler wire is pulled out from the pail pack cannot be completely straightened even after passing the filler wire through the wire supply nozzle, which causes the laser beam to form an offset during welding.

Furthermore, for the conventional straight filler wire supply nozzle, the coiling set formed within the filler wire reel, and the bent deformation of the filler wire in the direction vertical to the direction of the filler wire formed in the step of supplying the filler wire remain after passing the filler wire through the filler wire supply nozzle. Consequently, the filler wire oscillates up and down and from right to left at the welding point, and tends to shift from a target position. When the filler wire supply apparatus comprises a pail pack, a wire feeder and a wire supply nozzle, the twist of the wire feeder is accumulated in the entire wire supply apparatus. When the wire supply is continued, the twist strain is released at a certain time point, and as a result the twist deformation of the filler wire is straightened so that the filler wire recovers its original shape. At the instant of the filler wire shape recovery, the filler wire shifts. As a result, the filler wire markedly shifts at the welding point after passing the wire supply nozzle to cause the filler wire to shift from the target position.

Accordingly, stabilized supply of the filler wire to the butt portion with high accuracy of the supply position is also required in butt welding by a laser beam.

DISCLOSURE OF INVENTION

A first object of the present invention is to make the depth of penetration in the weld bead portion uniform, and obtain a bead shape with a flat bottom without spiking and meltdown in butt welding of hot-rolled steel materials by a laser beam.

The first object also includes, in particular, prevention of the formation of blow holes in the weld bead.

A second object of the present invention is to stably supply a filler wire to the butt portion with high accuracy of the supply position in butt welding hot-rolled steel materials by a laser beam.

In order to accomplish the first object, in a method of butt-welding hot-rolled steel materials by a laser beam according to a first aspect of a first invention by blowing center gas against a welding portion symmetrically to the optical axis of the laser beam while side gas is being blown thereagainst from the side, the method comprises conducting welding while the center of laser-induced plasma is shifted in the welding direction from the center of the laser beam by a distance 0.2 to 0.5 times as much as a reference plasma diameter determined from the laser output and the beam diameter, and the type and flow rate of the center gas.

Laser irradiation generates laser-induced plasma (reference plasma) $P_O$ which rises along a laser beam optical axis $l_L$ on a keyhole K as shown in FIG. 5. In the present invention, side gas $G_S$ is blown against the laser-induced plasma $P_O$ to shift it in the welding direction, namely, in the non-welded position direction by a distance 0.2 to 0.5 times as much as a reference plasma diameter $D_{PO}$. When the shift distance is less than 0.2 times the reference plasma diameter $D_{PO}$, preheating by the plasma and the output of the laser beam having passed through the plasma cannot be ensured. Moreover, when the shift distance exceeds 0.5 times the reference plasma diameter $D_{PO}$, generation of the plasma becomes destabilized. When the generation region of the laser-induced plasma P is shifted from the irradiation position of the laser beam LB at a distance of $\delta_X$, the laser beam LB irradiates the welding portion which is outside a relatively high electron density range of the plasma P which has been positionally shifted. As a result, an amount of the laser beam LB absorbed by the plasma P decreases. Moreover, the energy density of the laser beam LB which reaches the hot-rolled steel materials S increases and becomes constant. The following results are thus obtained: extreme generation of spiking is suppressed, and meltdown caused by excessive penetration does not take place; the depth of penetration becomes uniform, and the bottom of the welded bead becomes flat, the laser energy efficiency is improved, and the depth of penetration and the width of the welded bead are increased so that a stabilized joint can be formed. As a result, the bonded area is increased, and the allowable value of an offset is widened even when the butt line is varied. Therefore the bonding accuracy is increased by forming a stabilized joint, and fracture during a pressure welding process subsequent to laser welding can be prevented.

A laser welding nozzle for butt-welding hot-rolled steel materials according to a second aspect of the first invention comprises a plurality of center nozzles, the center gas blowing holes of which are located on a circumference with its center being the laser beam optical axis and arranged symmetrically to the laser beam optical axis, and a single side nozzle the side gas blowing hole of which is located outside the circumference mentioned above, the center gas synthesis point being situated above the focused point of the laser beam, and the intersection of the side nozzle axial line and the laser beam optical axis being situated between the center gas synthesis point and the focused point of the laser beam.

For the laser welding nozzle formed as described above, the blowing diameter and the blowing direction (inclined angle of nozzle) of each center nozzle or the side nozzle are determined in advance at the time of designing the nozzles on the basis of the laser output and the welding conditions. In order to determine the relative position between the synthesis pressure of the gas and the focused point of the laser beam, namely, in order to locate the center of the laser-induced plasma in a necessary position, the flow rate of the center gas and that of the side gas are each adjusted.

In order to accomplish the same first object, in a method according the second invention of tack welding by a laser beam during the production of a hot-rolled steel material or a steel strip by bonding a plurality of hot-rolled steel materials and continuously hot-rolling the bonded steel material, wherein the tail end of the preceding steel material and the front end of the following steel material are butted against each other and the butt portion is tack-welded by a laser beam, the method comprises scanning the butt line with the laser beam, during laser welding mentioned above, along at a speed of 2 to 10 m/min, and simultaneously oscillating the laser beam in the direction vertical to the butt line at a frequency of 40 to 80 Hz at an amplitude of 0.4 to 1.0 mm.

As shown in FIG. 6, the present inventors have defined a variation amount of the welded portion Bd (mm) and an average bead depth d (mm), and investigated a method of decreasing the variation in bead depth using a variation ratio (Bd/d×100) as an index of the variation in bead depth. First, in order to examine the relationship between a welding speed and a variation ratio, experiments on laser welding of the butt portions of steel materials at 1,000° C. were carried out using a $CO_2$ laser having an output of 14 kW. The results are shown in FIG. 7. Even when the welding speed was changed, the variation ratio could not be decreased. On the other hand, experiments on laser welding were conducted at a welding speed of 3 m/min while the laser beam was being oscillated in the direction vertical to the butt line at a frequency of 50 Hz. The results are shown in FIG. 8. The variation ratio was decreased by oscillating the laser beam in the direction vertical to the butt line. The experiments show that the effects of decreasing the variation ratio are significant particularly in an oscillation amplitude range of 0.4 to 1.0 mm, and that the effects become maximum when the oscillation amplitude is 0.7 mm.

It has therefore been decided in the present invention that the butt line is scanned with the laser beam at a speed of 2 to 10 m/min while the laser beam is being oscillated in the direction vertical to the butt line at a frequency of 40 to 80 Hz at an amplitude of 0.4 to 1.0 mm. The mechanism of decreasing the variation ratio of bead depth by oscillating the laser beam in the direction vertical to the butt line will be explained below.

FIG. 9(a) shows a cross-sectional view of a laser-irradiation point according to the present invention. FIG. 9(b) shows a cross-sectional view of a laser irradiation point during conventional laser tack welding conducted under the same conditions as in FIG. 9(a) except that the laser beam is not oscillated. It is clear from comparison of FIG. 9(a) and FIG. 9(b) that the bead width $W_1$ in the present invention is broader than the bead width $W_0$ in the conventional method. On the other hand, the bead depth in the present invention is shallower than that in the conventional method having been conducted at the same welding speed. FIG. 9(a) and FIG. 9(b) also show the behavior of the laser beams multiply reflected in the interiors of the keyholes. Because the laser beam is oscillated at high speed in the present invention, the spot-like heat source $Q_1$ formed at the bottom of the keyhole is widened compared with the spot-like heat source $Q_0$ formed in the conventional method, and the energy density becomes small. The behavior of the spot-like heat source is stabilized by making the energy density of the spot-like heat source small in the present invention as explained above, and as a result the depth of the secondary bead derived from the spot-like heat source is stabilized.

In the present invention, the laser beam scans the butt line at a speed of 2 to 10 m/min. The scanning speed is determined to be in such a range because the heat input becomes excessive and meltdown takes place in the welding portion when the welding speed is less than 2 m/min; conversely, a sufficient welded area cannot be ensured when the welding speed exceeds 10 m/min.

Furthermore, the laser beam is oscillated in the direction vertical to the butt line at a frequency of 40 to 80 Hz at an amplitude of 0.4 to 1.0 mm. The frequency is determined to be from 40 to 80 Hz because the welded potion merely snakes and the effects of the present invention cannot be obtained when the frequency is less than 40 Hz, and because the effects of the invention are saturated when the frequency exceeds 80 Hz. Moreover, the amplitude is determined to be from 0.4 to 1.0 mm because the spot-like heat source is not widened sufficiently and the effects of the present invention cannot be obtained when the amplitude is less than 0.4 mm, and because the bead depth becomes insufficient when the amplitude exceeds 1.0 mm.

In order to achieve the first object by preventing formation of blow holes in the weld bead, in a method of butt-welding hot-rolled bars by a laser beam according to the third invention, the method comprises conducting laser welding while a filler wire of an iron series base material, containing from 0.05 to 3% of one or at least two elements selected from aluminum, silicon, titanium and manganese, is being supplied to the welding portion.

It is essential that the filler wire metal components form oxides which are not evaporated, and it is necessary that the filler wire metal components contain metal which is highly reactive with oxygen (having a high reducing ability). Accordingly, it is necessary that the filler wire contain a simple substance of aluminum, silicon, titanium or manganese, or a combination of at least two of these simple substances at least in a given amount. The lower limit of the content of these components is defined to be 0.05% because the filler wire cannot show a sufficient reducing ability when the content is less than 0.05%. Moreover, the upper limit is defined to be 3% because the weld zone is drastically embrittled when the content exceeds 3%, and because there is the possibility that the weld zone may be fractured during rolling in the latter process.

The filler wire metal supplied to the welding portion is melted in a mixture of a molten portion of the workpiece, which is a component of the bead, and scales. As a result, the reducing ability of a metal element such as aluminum prevents a reaction between carbon and oxygen in the scales which mainly causes formation of blow holes, and no carbon monoxide gas is generated. Moreover, even when there are gaps in the groove portion because of the presence of recesses and protrusions, the filler wire metal is embedded in the recessed and protruded portions by the supply of the filler wire, and no lack of penetration is produced.

In the method of butt-welding hot-rolled steel materials described above, the filler wire can be supplied to a laser-induced plasma in front of the laser beam irradiation portion, in the welding direction. The filler wire is continuously heated by the laser beam in the laser welding position, and supplied to the welding portion in a molten state. At a supply portion of the filler wire, the laser beam is allowed to directly impinge on the filler wire in the conventional laser welding. However, when the filler wire is not directly supplied to the laser irradiation portion but is supplied to the laser-induced plasma, the workpiece can be melted with a plasma energy without losing a laser energy.

Furthermore, in the method of butt-welding hot-rolled steel materials, welding can also be conducted while the center of the laser-induced plasma is being shifted from the laser beam optical axis in the welding direction. As a result of shifting the generation region of the laser-induced plasma from the laser beam irradiation position, the laser beam irradiates the welding portion outside the portion of the plasma at a relatively high electron density range. The amount of the laser beam absorbed by the plasma is therefore decreased; moreover, the energy density of the laser beam which reaches the hot-rolled steel materials increases, and becomes constant. Consequently, extreme generation of spiking is suppressed, and meltdown caused by excessive penetration comes not to take place. The depth of penetration thus becomes uniform, and the bead bottom becomes flat. Moreover, the laser energy efficiency is improved, and the bead depth and the bead width are increased to form a stabilized joint. As a result, the bonded area is increased, and the allowable value of an offset is widened even when the butt line is varied; therefore the bonding accuracy is increased by forming a stabilized joint, and fracture during a pressure welding process subsequent to the laser welding can be prevented.

In order to achieve the second object, in a method of conducting butt welding by a laser beam while a filler wire is being supplied to a butt portion according to a first aspect of the fourth invention, the method comprises passing the filler wire through a wire supply nozzle having a curved portion, whereby the filler wire is supplied toward the welding point along the welding line.

The filler wire has heretofore been supplied toward the welding point from obliquely above the atmosphere of the laser-induced plasma. In the present invention, the filler wire is supplied toward the welding point along the welding line using a curved wire supply nozzle. Accordingly, the filler wire can be supplied to the welding point without being excessively influenced by the atmosphere of the laser-induced plasma. As a result, the filler wire is stably melted by the plasma near the welding point to form uniform penetration and improve the welding ability. Moreover, because the wire supply nozzle is curved, the linear portion on the inlet side of the curved portion can be arranged closely to the welding torch; therefore, the periphery of the welding torch can be made compact.

In a method of butt welding by a laser beam while a filler wire is being supplied to a butt portion according to a second aspect of a fourth invention, the method comprises passing the filler wire through a wire supply nozzle having a curved portion, whereby the filler wire is plastically bent to have the coiling set straightened, and supplying the filler wire to the welding portion.

Because the filler wire is supplied to the welding portion after the coiling set of the filler wire is straightened, the filler wire can be supplied to the welding portion with high positional accuracy even when its projected length is long. Even when a clearance between the filler wire and the workpiece is necessary in, for example, laser-welding hot-rolled sheet bars, a filler wire supply accuracy necessary for stabilized filler wire supply welding can be ensured while a sufficient clearance is being secured.

According to a third aspect of the fourth invention, a filler wire supply nozzle used for the butt welding by a laser beam comprises a nozzle front portion which comprsies at least one curved portion between two linear portions, and the two linear portions and the curved portion are in the same plane.

Because the wire supply nozzle has linear portions on both sides of the curved portion, respectively, the effects of straightening the coiling set are significant. Moreover, because the outlet side of the curved portion is linear, the filler wire can be accurately directed to the welding point.

In a butt welding apparatus using a laser beam according to a fourth aspect of the fourth invention, which is equipped with a wire supply source having a pail pack or a wire reel, and a wire feeder feeding a filler wire to a wire supply nozzle, the butt welding apparatus comprises two roller levelers which are arranged in tandem along the wire feed direction between the wire supply source and the wire feeder in such a manner that the straightening direction of one of the roller levelers makes an angle of 90° with that of the other roller leveler.

When the wire supply apparatus is conventionally formed from a pail pack, a wire feeder and a wire supply nozzle, a roller leveler has been arranged after the wire feeder for the purpose of preventing the filler wire from buckling. In the present invention, the roller leveler is provided not after the wire feeder but between the wire supply source and the wire feeder to straighten the twisted deformation of the filler wire formed within the wire supply source such as a pail pack, and the strain of the filler wire formed during uncoiling the wire. Moreover, when a pail pack is used, the axial rotation of the filler wire during feeding the filler wire can be stopped by the roller levelers and, as a result, the influence of a rotary twist strain formed on the pail pack side by the wire feeder can be excluded. When the curved wire supply nozzle is used, an offset of the filler wire from the laser beam at the welding point can be eliminated. Moreover, the coiling set formed within the pail pack and the twist deformation of the filler wire formed during pulling out the filler wire from the pail pack cannot be straightened by the conventional straightening procedure in one direction alone, but can be straightened by the straightening procedure in the two axial directions vertical to each other with the roller levelers directly after the pail pack. The straightening forces of the roller levelers assembled in the upper and lower stages (two stages) can be each independently changed, and the forces can be readily adjusted during wire exchange. Consequently, even when a curved wire supply nozzle which is unsuitable for the rotation in the twisting direction of the filler wire is used, the filler wire can be stably supplied to the welding point.

In the butt welding apparatus mentioned above, it is desirable to use the wire supply nozzle having a curved portion as a wire supply nozzle. In this case, because the coiling set can be straightened by the roller levelers and the wire supply nozzle, the filler wire can be supplied to the welding point more accurately.

BRIEF DESCRIPTION OF DRAWINGS

FIG. 5 is a cross-sectional view showing a method of butt welding by a laser beam according to the first invention.

FIG. 6(1) is a transverse cross-sectional view and FIG. 6(2) is a longitudinal cross-sectional view each showing a bead depth during the formation of a weld bead.

FIGS. 13(a), 13(b) and 13(c) are graphs showing the results of measuring a gas pressure distribution when the relative position between a side gas blowing point and a laser beam focused point are changed in three ways.

FIG. 24 is a side view showing the arrangement of a sheet bar butt welding apparatus using a laser beam.

FIG. 25 is a plan view of the sheet bar butt welding apparatus shown in FIG. 24.

FIGS. 26(*a*) and 26(*b*) are a side view and a front view, respectively each showing an amount shifted from the target position during filler wire supply.

BEST MODE FOR CARRYING OUT THE INVENTION

The method of butt-welding hot-rolled steel materials according to the first invention is used for non-piercing butt welding of hot-rolled steel materials at temperatures of at least 900° C. The thickness of the hot-rolled steel materials is from 25 to 50 mm, and the width thereof is from about 600 to 1,200 mm. A $CO_2$ laser is suitable as the laser. The output is at least 25 kW, and the beam diameter is from about 0.4 to 0.6 mm. He gas or Ar gas is used as the center gas and the side gas. The flow rate of the center gas supplied to the welding portion is from about 40 to 120 l/min, and that of the side gas is from about 40 to 80 l/min.

Figure 10:
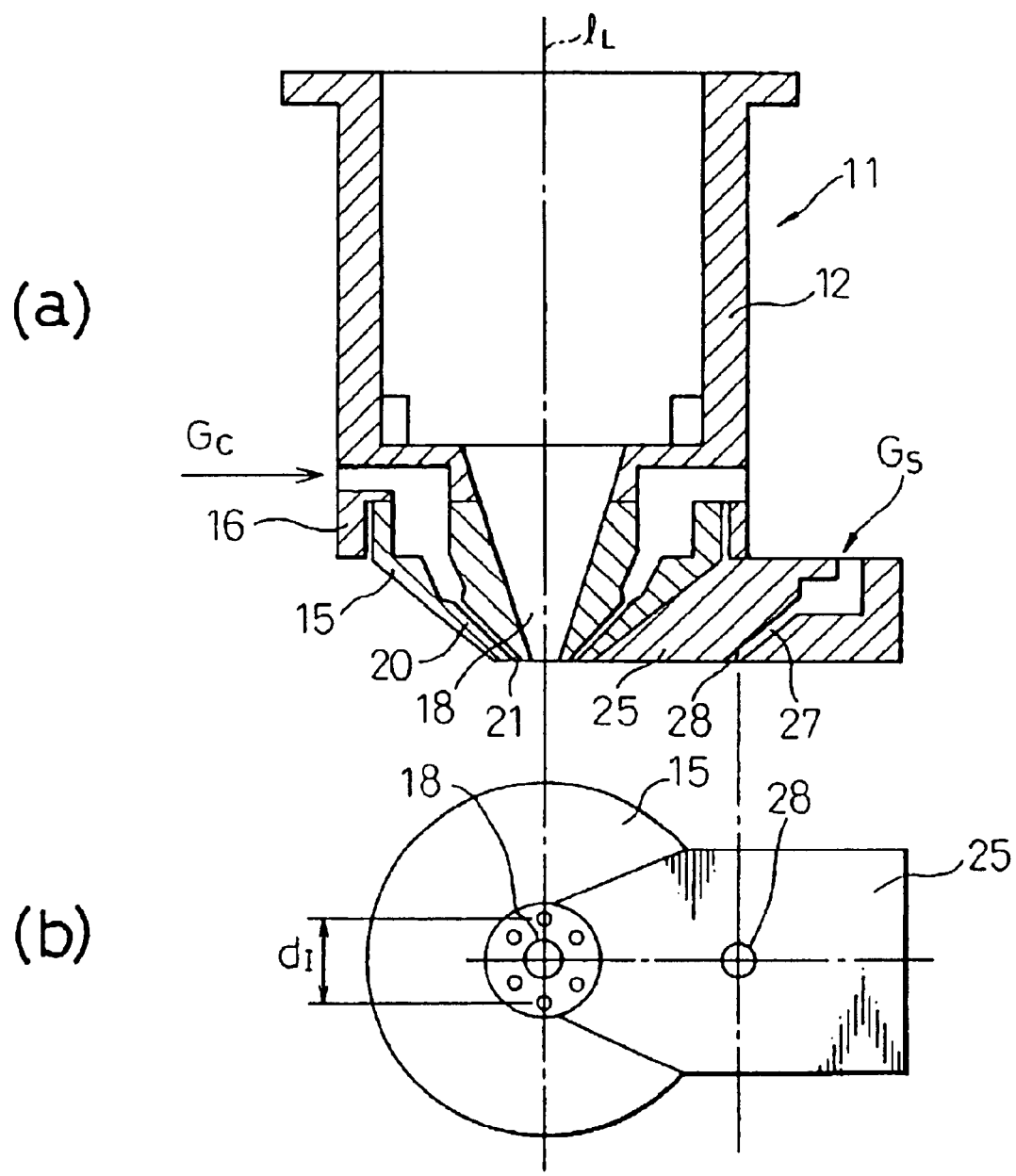
FIGS. 10(a) and 10(b) are a longitudinal sectional view and a bottom view, respectively, of a laser welding nozzle according to the first invention.

FIG. 10 shows one embodiment of a laser welding nozzle according to the first invention. A laser welding nozzle 11 is equipped with a cylindrical nozzle main body 12. A center nozzle block 15 is attached to the lower end portion of the nozzle main body 12 with screws 16. The center nozzle block 15 is provided with a laser beam nozzle 18 and six center nozzles 20 therearound. Center gas blowing holes 21 of the center nozzles 20 are arranged at intervals of 60° on a circumference with its center placed on a laser beam optical axis $l_L$. Center gas $G_C$ is supplied to the center nozzles 20 from a center gas container through a flow control valve (both not shown). A side nozzle block 25 is attached to the center nozzle block 15. The side nozzle block 25 is provided with a side nozzle 27. A side gas blowing hole 28 of the side nozzle 27 is on the plane of the center gas blowing holes 21, and is situated outside the circumference mentioned above. Side gas $G_S$ is supplied to the side nozzle 27 from a side gas container through a flow control valve (both not shown). In addition, a filler wire W is supplied to the welding portion from a wire nozzle 35 provided in a position opposite to the side nozzle 27.

Figure 1:
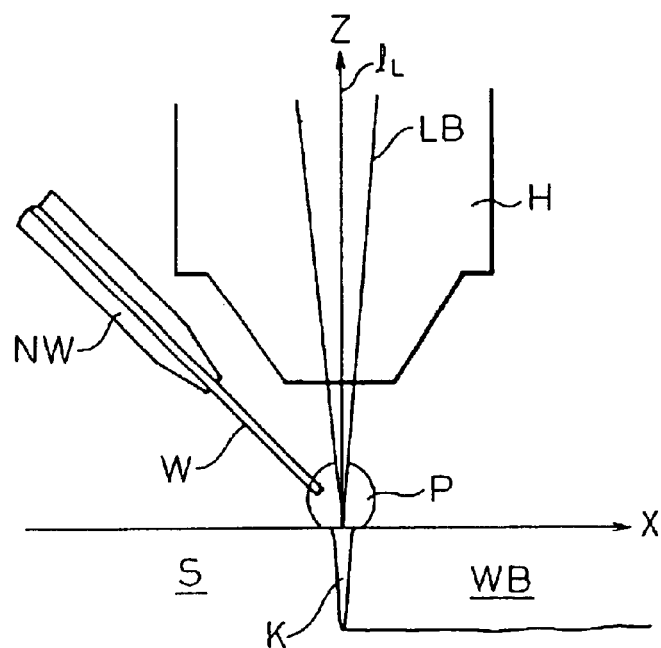
FIG. 1 is a cross-sectional view showing a general method of butt welding by a laser beam.
Figure 2:
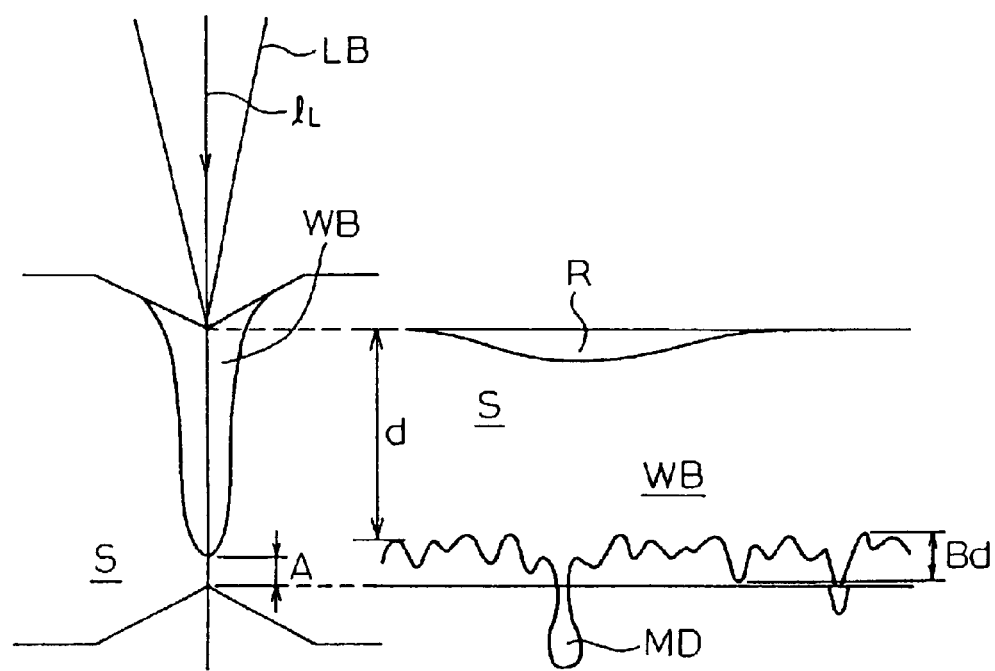
FIGS. 2(a) and 2(b) are a transverse cross-sectional view and a longitudinal cross-sectional view, respectively, of a weld bead portion showing the depth of penetration formed by the conventional laser welding method.
Figure 3:
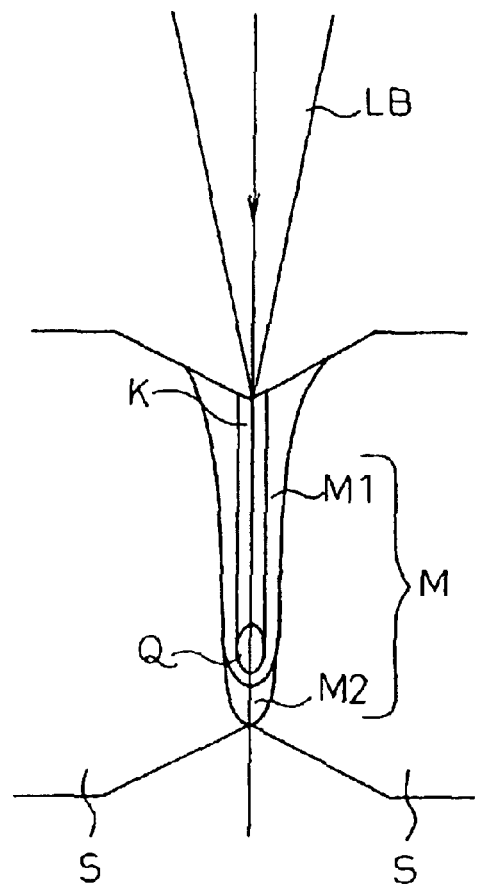
FIG. 3 is a transverse cross-sectional view showing the transverse cross-section of the conventional weld bead portion shown in FIG. 2(a), in more detail.
Figure 4:
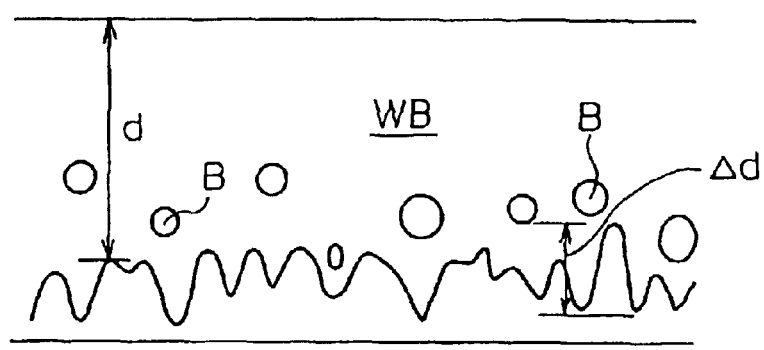
FIG. 4 is a longitudinal cross-sectional view showing blow holes in the longitudinal cross-section of the conventional weld bead portion shown in FIG. 2(b).
Figure 11:
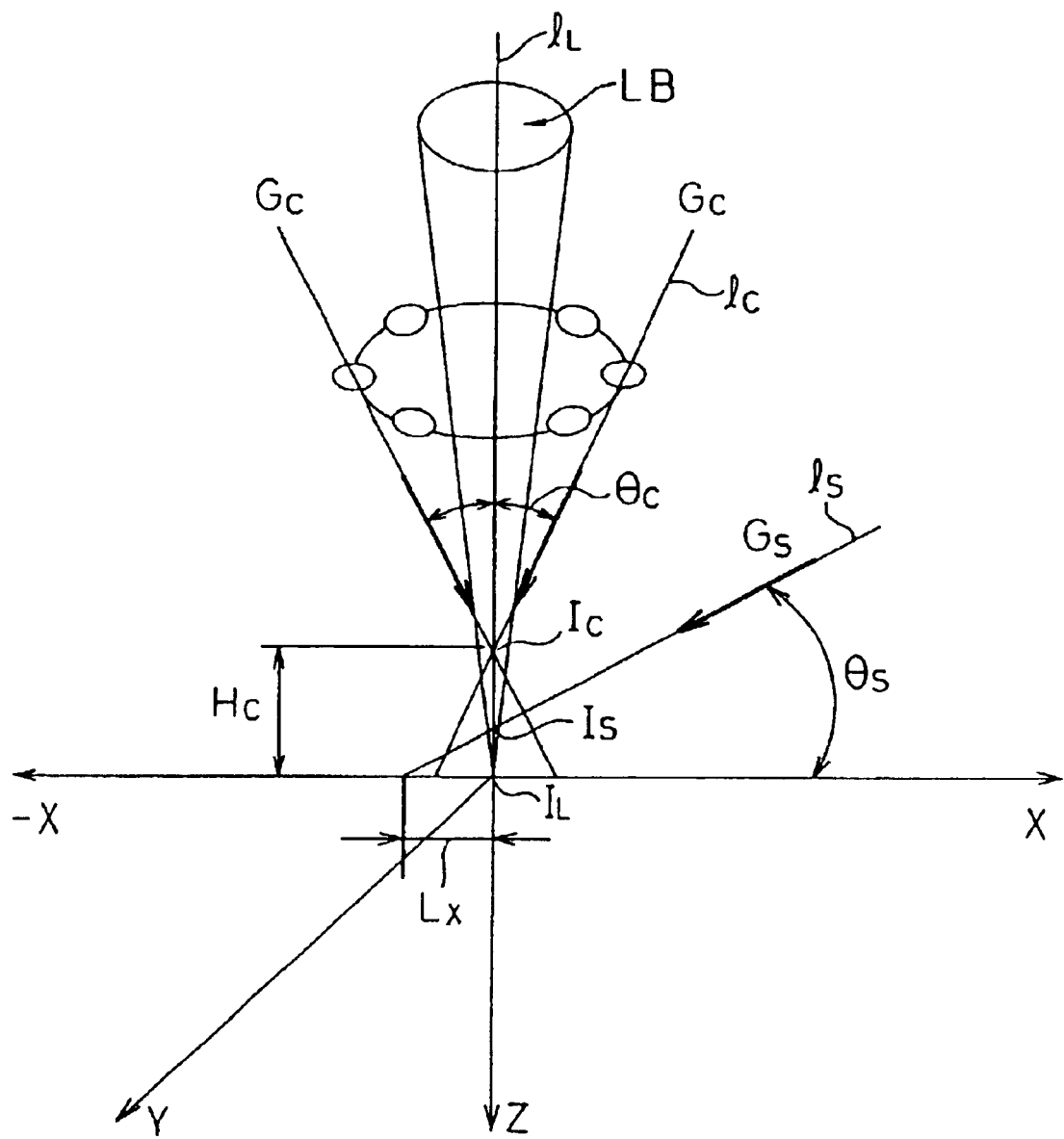
FIG. 11 is a view showing the positional relationship among the parts of the welding nozzle shown in FIG. 10.

For the laser welding nozzle formed as described above, the dimensions and shapes of the center nozzles and the dimension and shape of the side nozzle must be appropriate to make the center of laser-induced plasma situated in a necessary position when the gas flow rates are controlled. In order to achieve the object, for example, the following dimensions and shapes are selected: the number of the center nozzles is from 5 to 7; the spacing $d_1$ of the blowing holes is from 5 to 20 mm; the diameter of the center gas blowing holes is from about 1 to 2 mm; the blowing synthesis angle $\theta_C$ of the center gas is from 10 to 60°; the diameter of the side gas blowing hole is from about 3 to 6 mm; and the side gas blowing angle $\theta_S$ is from 15 to 45°. Moreover, as shown in FIG. 11, the center gas synthesis point (intersection of the center nozzle axial line $l_C$) $I_C$ is situated above the focused point $I_L$ of the laser beam LB, and the intersection $I_S$ of the side nozzle axial line $l_S$ and the laser beam axial line $l_L$ is situated between the center gas synthesis point $I_C$ and the focused point $I_L$ of the laser beam LB. In addition, the x-, y- and z-axes in FIG. 3 indicate the welding line direction, the transfer direction of the hot-rolled steel materials and the height direction, respectively. Moreover, the spacing between the center gas synthesis point and the hot-rolled steel material surface is represented by $H_C$, and the spacing (target position of blowing) between the side gas blowing point on the hot-rolled steel material surface and the focused point $I_L$ of the laser beam LB is represented by $L_X$. The spacing $H_C$ is from 10 to 20 mm, and the target position of blowing $L_X$ is from about 3 to 10 mm.

Figure 7:
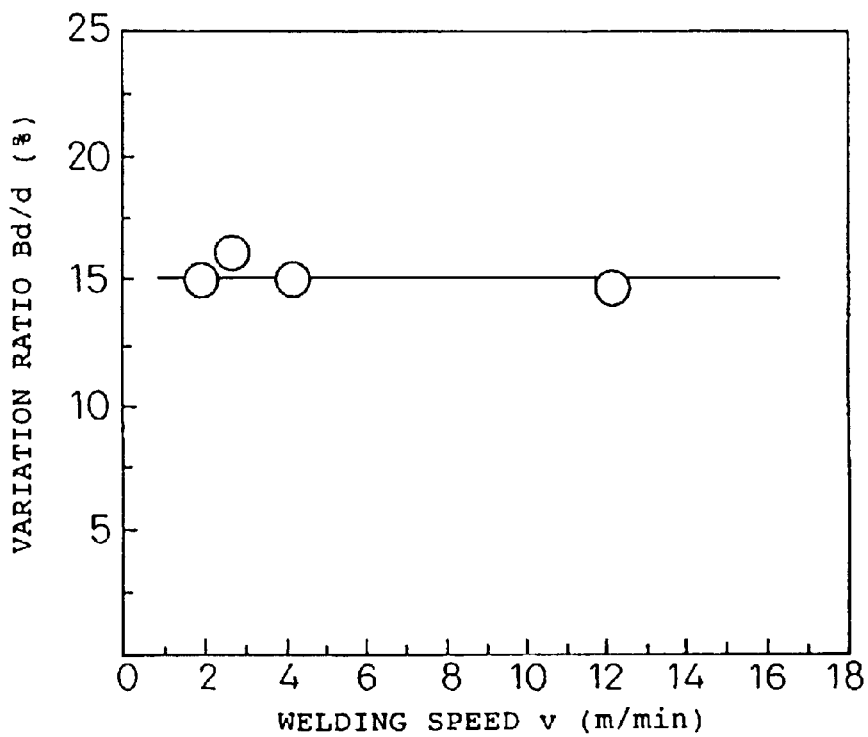
FIG. 7 is a graph showing the correlation between a welding speed and a variation ratio of bead depth (Bd/d).
Figure 8:
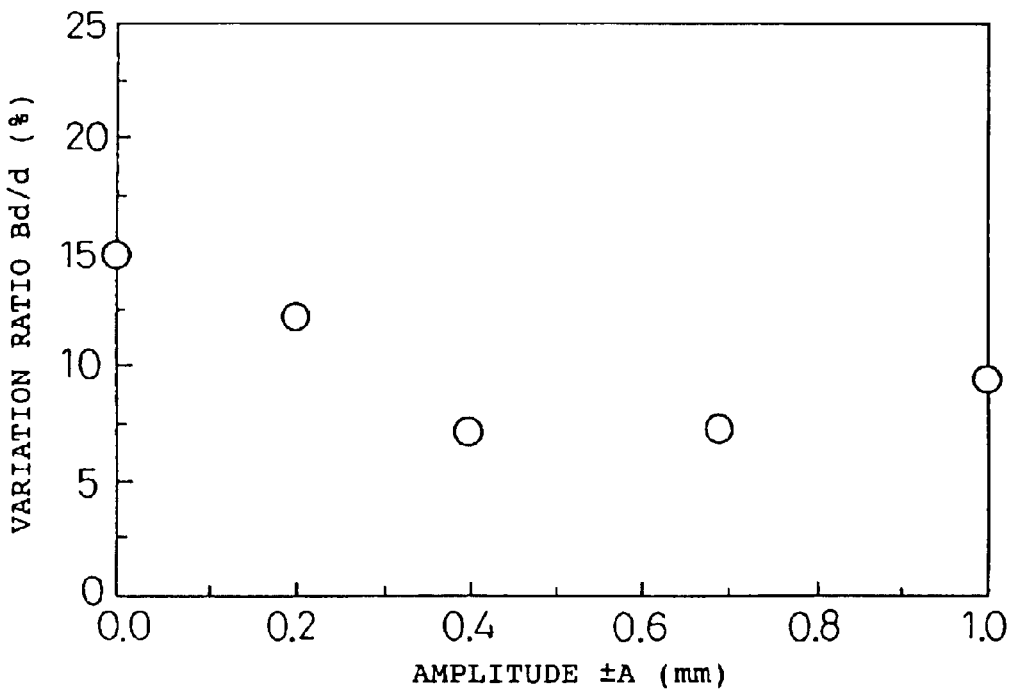
FIG. 8 is a graph showing the correlation between an oscillation amplitude of a laser beam and a variation ratio of depth of penetration (Bd/d).
Figure 9:
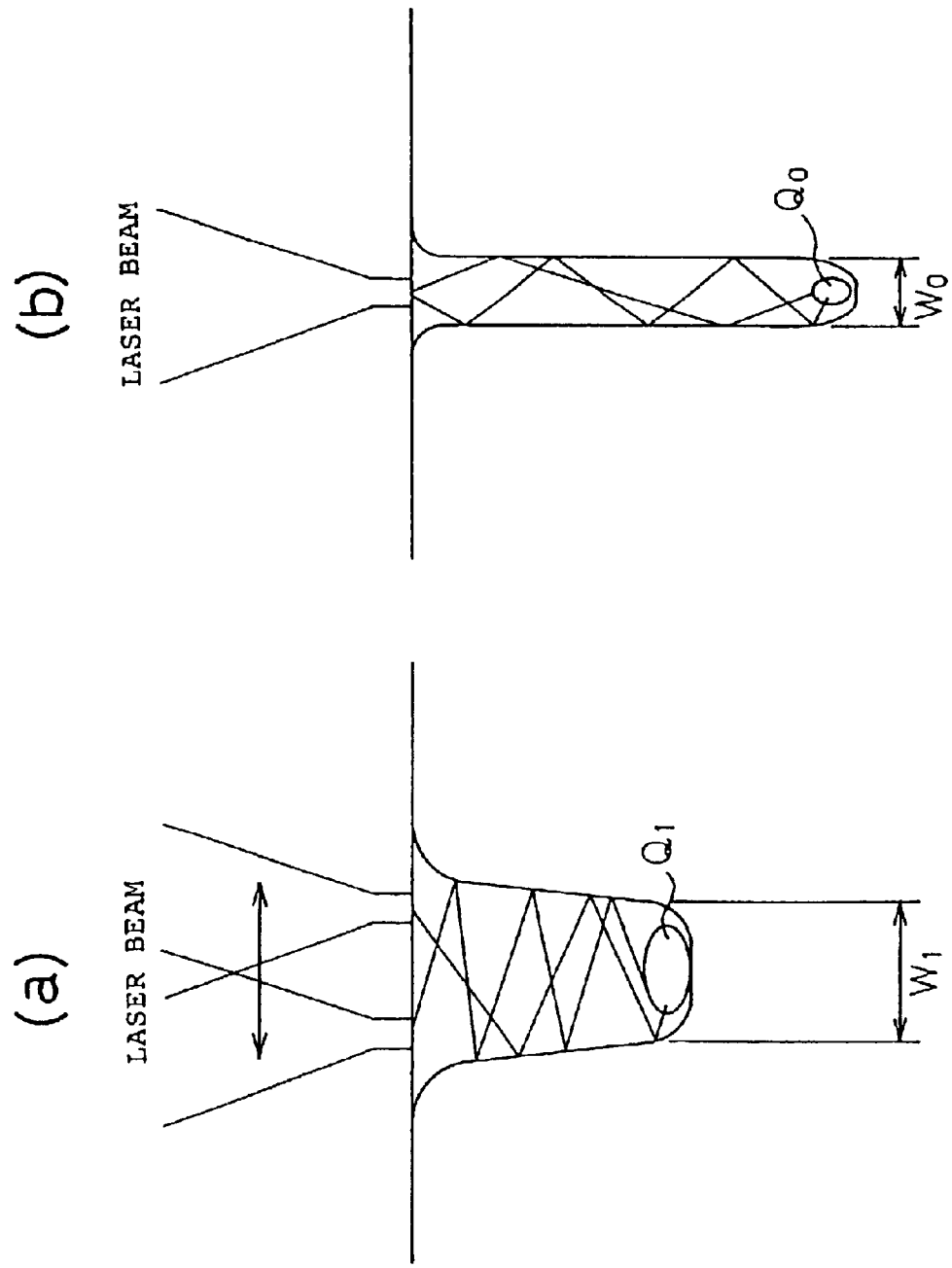
FIGS. 9(a) and 9(b) are cross-sectional views showing laser irradiation points, wherein the laser beam is oscillated in accordance with the second invention in FIG. 9(a), and the laser beam is, conventionally, not oscillated in FIG. 9(b).

As shown in FIG. 6 mentioned above, the ratio of the variation in the depth of penetration Bd to the average depth of penetration d is defined as a variation ratio Bd/d. For the conventional laser welding method, the variation ratio Bd/d is about 20%. Moreover, the variation ratio Bd/d does not depend on a welding speed V as shown in FIG. 7 mentioned above. When the welding speed V increases, the depth of penetration decreases, and the variation in the depth of penetration Bd also decreases in the same proportion. When laser-induced plasma generated during welding is utilized as a secondary heat source in relation to the laser beam, the variation ratio Bd/d decreases from 20% to about 15%.

Figure 12:
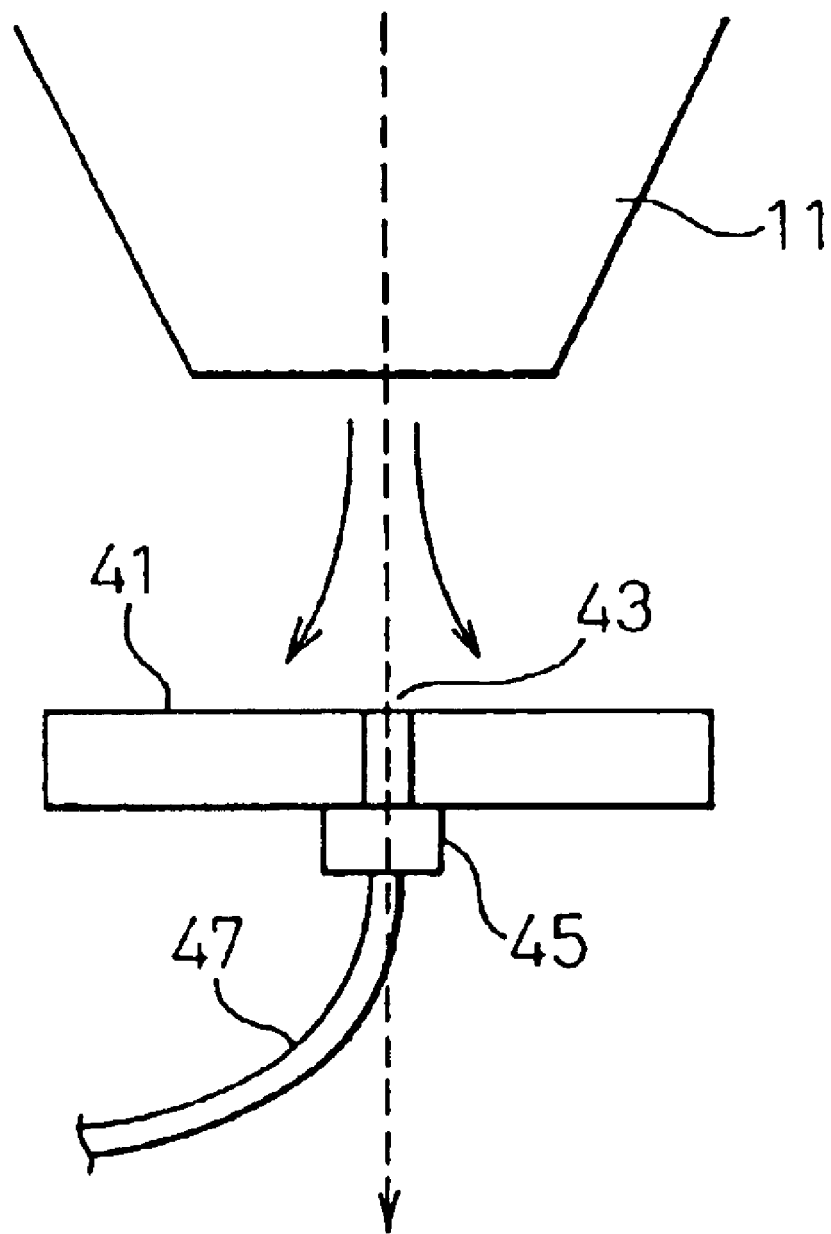
FIG. 12 is a cross-sectional view showing a method of measuring a gas pressure distribution near a laser welding nozzle.

Next, the relationship between a side gas blowing position and a gas pressure distribution on the surface of a workpiece will be explained. FIG. 12 shows the outline of a method of measuring a gas pressure distribution. A pressure disc 41 is arranged immediately under the laser welding nozzle 11, and a pressure hole 43 having a diameter of 0.5 mm is provided thereto. The pressure hole 43 has such a shape that the gas pressure distribution does not change. A pressure micro-sensor 45 is attached to the lower surface of the pressure disc 41 so that the pressure micro-sensor 45 blocks the pressure hole 43. Signals from the pressure micro-sensor 45 are processed by signal-processing apparatuses such as an amplifier through a signal line 47, and transmitted to a computer (both not shown), where the signals are data-processed.

Figure 14:
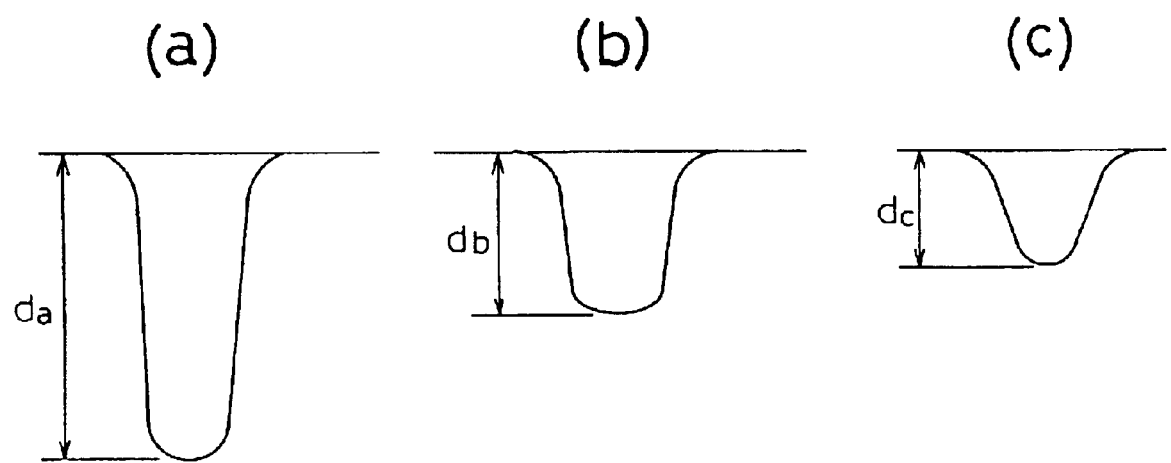
FIGS. 14(a), 14(b) and 14(c) are cross-sectional views showing the shapes of welded portions obtained in the cases shown in FIG. 13, respectively.

FIG. 13 shows the results of measuring the pressure distribution. The flow rates of the center gas and the side gas were constant, and were determined to be 80 l/min and 120 l/min, respectively. FIG. 13(*a*) shows the results of measuring the pressure distribution when the positional spacing $L_X$ between the side gas blowing point on the hot-rolled steel material surface and the focused point of the laser beam (refer to FIG. 11) was determined to be −7 mm. FIG. 13(*b*) and FIG. 13(*c*) show the measurement results when the positional spacings $L_X$ were determined to be 0 mm and +7 mm, respectively. The effects are shown, in FIG. 14(*a*), FIG. 14(*b*) and FIG. 14(*c*), as a change in the bead shape. FIG. 14(*a*) is a case where the positional spacing $L_X$ between the side gas blowing point on the hot-rolled steel material surface and the focused point of the laser beam was determined to be −7 mm, and shows that the bead depth increased. FIG. 14(*b*) is a case where the positional spacing $L_X$ was determined to be 0 mm, and shows that the effect was little. FIG. 14(c) is a case where the positional spacing $L_X$ was determined to be +7 mm, and shows that no effect was obtained. The variation ratio Bd/d decreases by about 5% when the following factors are optimized: the center gas blowing synthesis angle; the blowing hole spacing; the blowing angle, the position of intersection between the laser beam and the center gas blowing; the angle and the target position of side gas blowing; and the spacing between the center gas nozzle and the hot-rolled steel material.

Figure 15:
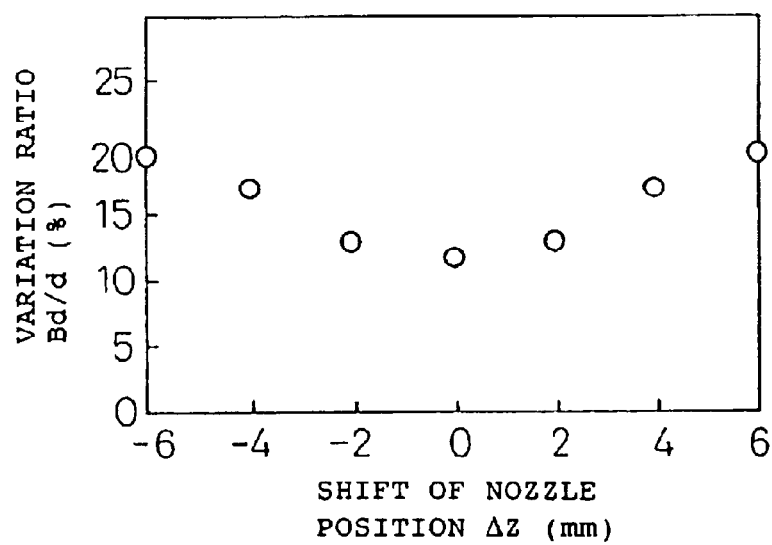
FIG. 15 is a graph showing the relationship between a positional shift of a laser welding nozzle and a variation ratio of a depth of penetration.

FIG. 15 shows the influence of inappropriate positioning of the side gas blowing on the variation ratio Bd/d when groove materials are butt-welded. Welding was conducted in a focused position of the laser, and the relative position of the laser welding nozzle including the side gas and the workpiece is shown on the abscissa as a nozzle control shift amount $\Delta z$. When the spacing between the focused point of the laser beam and the gas blowing point is −4 mm at which the effect of the side gas becomes maximum, the variation ratio Bd/d becomes minimum. The variation ratio Bd/d increases in accordance with the nozzle control shift amount Az of the laser welding nozzle. The Bd/d ratio is about 10% when the shift amount is 0, whereas the Bd/d ratio increases to about 20% when the shift amount is 6 mm.

As explained above, the generation region of the plasma can be controlled, and at the same time the variation ratio Bd/d can be optimized by optimizing the individual gas blowing directions and their flow rates, and the relation between the gas synthesis pressure and the focused point of the laser beam. Consequently, the laser energy efficiency can be increased, and the bead depth and the bead width can be increased, whereby a stabilized joint can be formed without meltdown caused by excessive penetration.

EXAMPLE 1

SS 41 steel plates at about 1,000° C. were butt-welded using 45 kw $CO_2$ gas laser, according to the first invention. Helium was blown as center gas at a flow rate of 80 l/min, and helium was also blown as a side gas at a flow rate of 80 l/min. The blowing angle of the side gas was determined to be 30°, and the blowing position in relation to the welding point is 4 mm in front of the welding point in the non-welded direction. The welding speed V was determined to be 3 m/min. As a result of butt welding, neither the meltdown of molten metal in the butt welding portion nor lowering of the bonded area ratio was observed. The variation ratio Bd/d was then about 10%. In addition, when adjustment of the welding gas conditions was not good, and the blowing position of the side gas was 6 mm above in the laser beam direction and was further shifted by 10 mm in front of the welding point, the variation ratio Bd/d increased to 20%.

The first invention can improve the laser energy efficiency, increase the bead depth and the bead width, and form a stabilized joint without meltdown caused by excessive penetration.

The objects of the method of laser tack welding according to the second invention are steel materials 25 to 50 mm long, and are principally sheet bars having been rough-rolled. The front and tail ends of such steel materials are cut by a flying shear so that the shape is adjusted. The tail end of the preceding steel material running on the production line and the front end of the following steel material are butted with each other, and tack-welded by laser, followed by continuously processing the welded material in the following steps. The sheet bars to be processed have temperature of about 900 to 1,150° C.

For example, a $CO_2$ laser oscillator having an output of 14 to 45 kW is suitable for the laser tack welding method of the present invention. The beam diameter on the laser irradiation side of such a laser oscillator is from 60 to 100 mm. The laser beam is focused so that it has a diameter of 0.4 to 0.8 mm on the surface of the workpiece, and the surface is irradiated therewith. The laser energy density on the surface of the workpiece becomes from 10 to 40 $MW/cm^2$. Irradiation of laser having such an energy density produces a keyhole at the laser irradiation point. Transfer of the laser irradiation point along a butt line makes laser welding with deep penetration possible.

In the present invention, when the laser beam is oscillated in the direction vertical to the butt line. That is, the laser irradiation point on the surface of the steel plate is oscillated vertically to the butt line.

Figure 16:
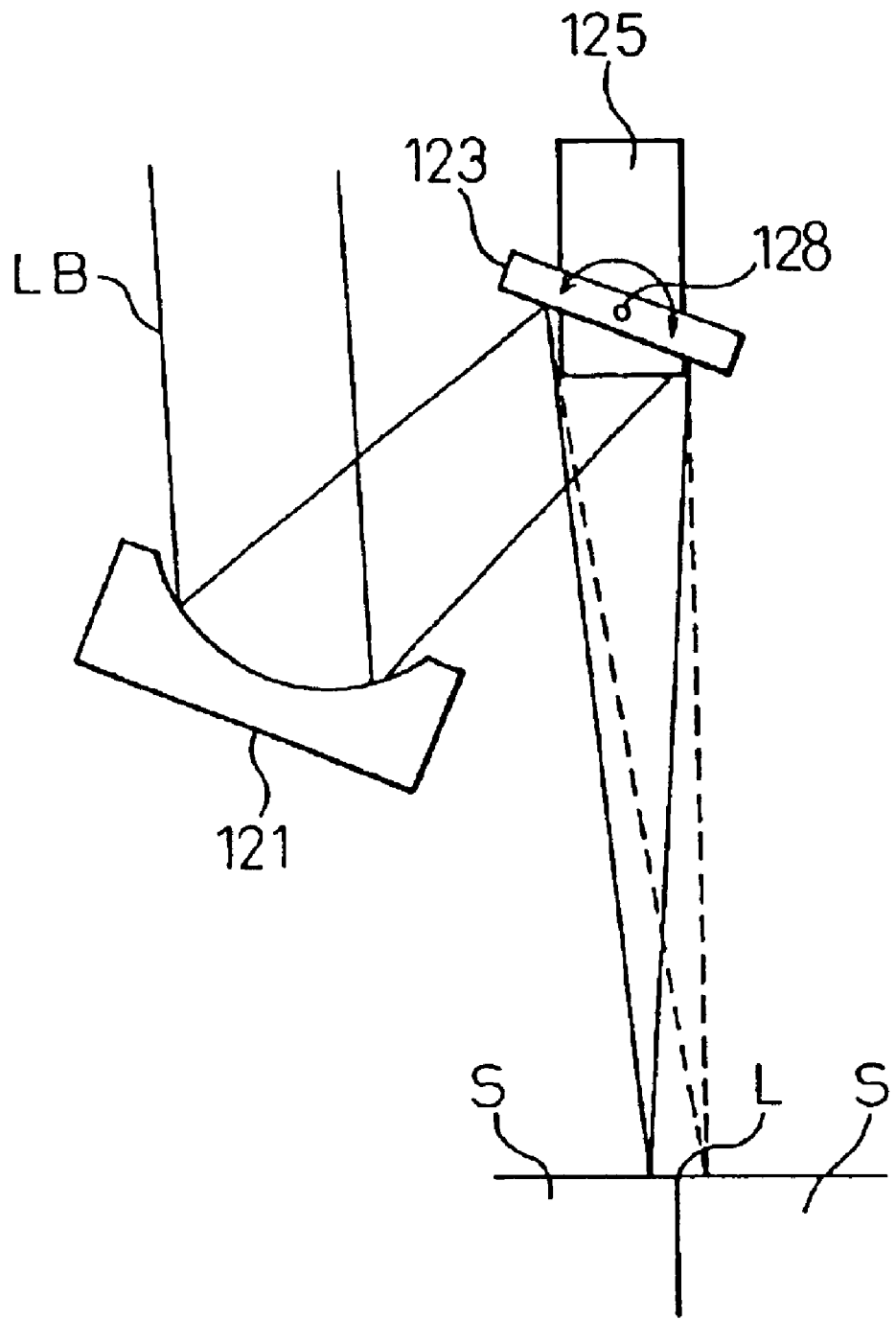
FIG. 16 is a front view showing a method of oscillating a laser beam by the second invention.

FIG. 16 shows one embodiment of the method of oscillating the laser irradiation point. FIG. 16 is a schematic view of a welding head portion which oscillates the laser irradiation point vertically to the butt line L. The welding head comprises a focusing mirror 121, a mirror 123, a mirror oscillation shaft 128 and a mirror oscillation mechanism 125. A laser beam LB incident on the welding head is given a convergent angle by the focusing mirror 121, and at the same time reflected and transmitted by the mirror 123. The mirror 123 is held by the mirror oscillation shaft 128, and oscillated by the mirror oscillation mechanism 125. Oscillation of the mirror 123 as explained above can oscillate the laser irradiation point vertically to the butt line L.

In addition, although FIG. 16 shows an embodiment in which the mirror 123 is oscillated, the focusing mirror 121 can also be oscillated while the mirror 123 is fixed. Moreover, when focusing and irradiation of a laser beam are conducted using a transmitted light system, for example, the transmitted light system such as a focusing lens is rocked to depict a circle. Alternatively, the focusing lens is held by a shaft vertical to the optical axis of the focusing lens, and the lens is oscillated with the shaft used as the center of oscillation.

EXAMPLE 2

SS 41 steel materials at about 1,000° C. were tack-welded, using a 45 kW $CO_2$ gas laser, according to the second invention. In order to shield the welding atmosphere from the air, welding was conducted while helium was being blown as a shield gas. Moreover, welding was conducted at a welding speed of 3 m/min while the laser beam was oscillated at a frequency of 50 Hz at an amplitude of 0.4 mm. As a result of conducting tack welding with laser as explained above, the variation ratio (Bd/d) thus obtained was about 7%. On the other hand, when the same SS 41 materials were tack-welded by laser by a conventional method wherein the laser beam was not oscillated, and the other conditions were the same as those mentioned above, the variation ratio (Bd/d) thus obtained was 15%.

Furthermore, when hot-rolled steel materials were buttwelded, neither the meltdown of molten metal nor lowering of the bonded area ratio was observed.

Figure 17:
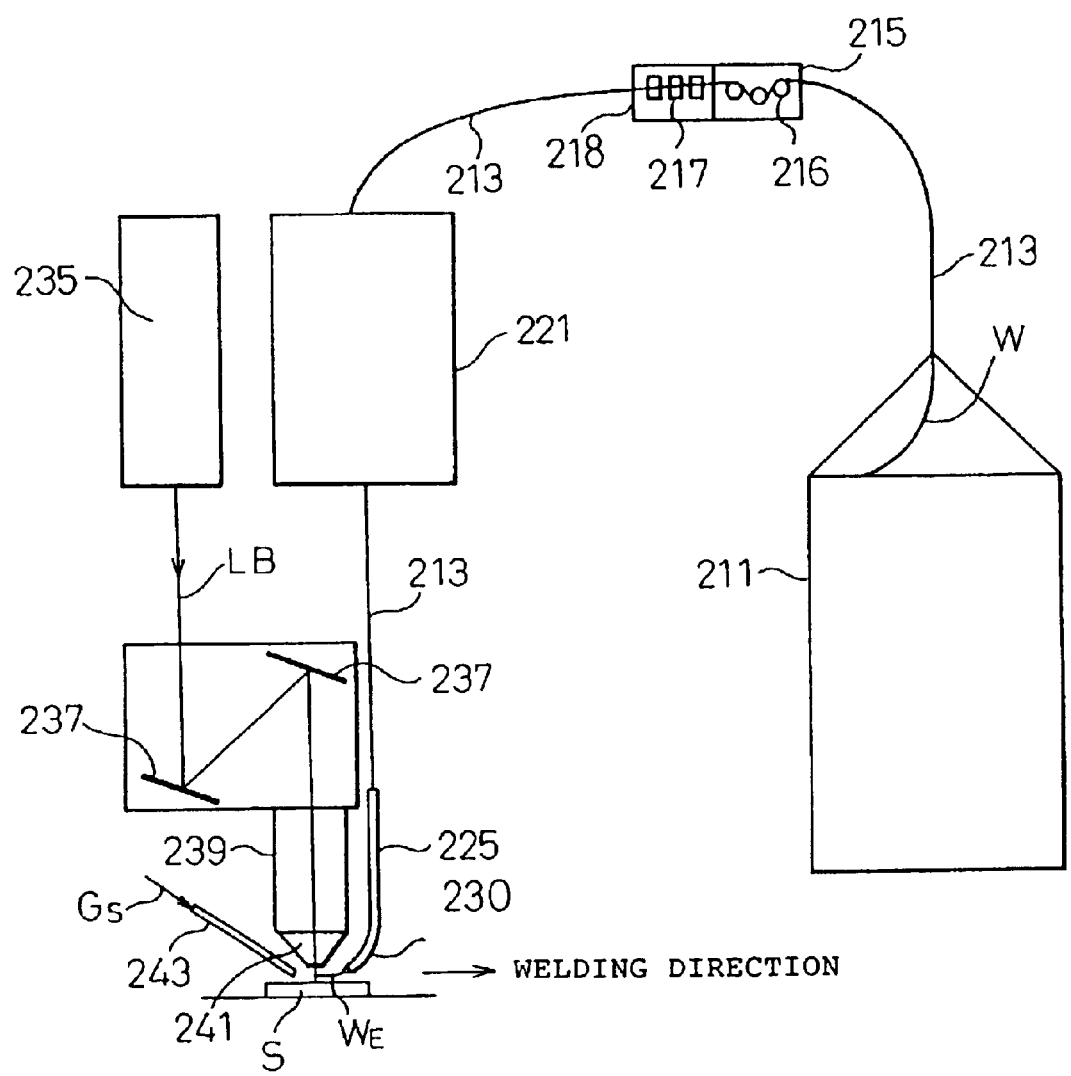
FIG. 17 is a layout drawing showing an apparatus for conducting butt welding by a laser beam of the third and the fourth invention.

FIG. 17 shows one embodiment of a laser butt welding apparatus for practicing the third invention in FIG. 17.

Figure 18:
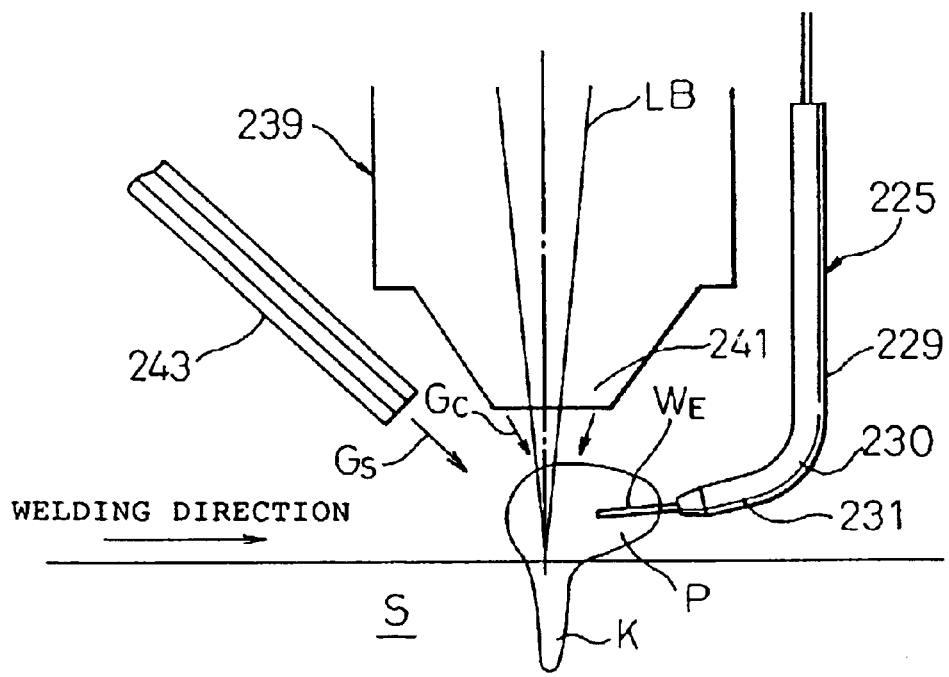
FIG. 18 is a cross-sectional view showing the welding head and its vicinity of the laser beam welding apparatus shown in FIG. 17.

FIG. 18 shows the welding head and its periphery of the laser butt welding apparatus in FIG. 17.

A filler wire W is accommodated within a pail pack 211 in a coil form. The filler wire W can be either of a solid type or of a flux-filled type. The filler wire W is pulled out of the pail pack 211 by a wire feeder 221, and fed to a wire supply nozzle 225 through a conduit 213. A first roller leveler 215 and a second roller leveler 218 are arranged between the pail pack 211 and the wire feeder 221. A laser beam LB is transmitted from a laser oscillator 235 to a welding head 239 through a transmitting mirror 237. The lower end portion of the welding head is a center gas nozzle 241 which supplies center gas $G_C$ to the welding portion. A side gas nozzle 243 which supplies side gas $G_s$ to the welding portion is arranged opposite to the wire supply nozzle 225. An argon or a helium gas is used as the center gas $G_C$ and the side gas $G_S$.

Because the roller shafts of the first roller leveler 215 make an angle of 90° with those of the second roller leveler 218 in such an apparatus as explained above, the coiling set of the filler wire W supplied from the wire feeder 221 is straightened so that the two straightening directions shift from each other to make an angle of 90°. The filler wire W is plastically deformed when it passes through the wire supply nozzle 225. The filler wire (projected wire portion) $W_E$ projected from the wire supply nozzle 225 is freed from the coiling set, and becomes substantially straight though it is curved. The projected wire portion $W_E$ is supplied toward the welding point along the welding line approximately in parallel with the surface of hot-rolled steel materials S.

As shown in FIG. 6 mentioned above, when the ratio of the variation in the depth of penetration Bd to the average depth of penetration d is defined as a variation ratio Bd/d, the variation ratio Bd/d is about 20% in the conventional laser welding method. Moreover, as shown in FIG. 7 mentioned above, the variation ratio Bd/d does not depend on the welding speed V. When the welding speed V increases, the depth of penetration decreases, and the variation Bd also decreases in the same proportion. When laser-induced plasma generated during welding is utilized as a secondary heat source in relation to the laser beam, the variation ratio Bd/d decreases from 20% to about 15%.

Figure 19:
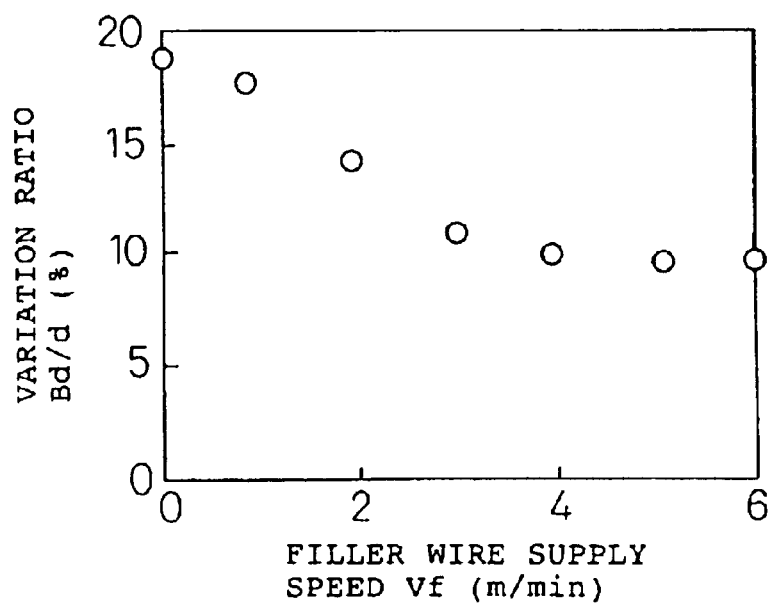
FIG. 19 is a graph showing the relationship between a filler supply speed and a variation ratio of a depth of penetration.
Figure 20:
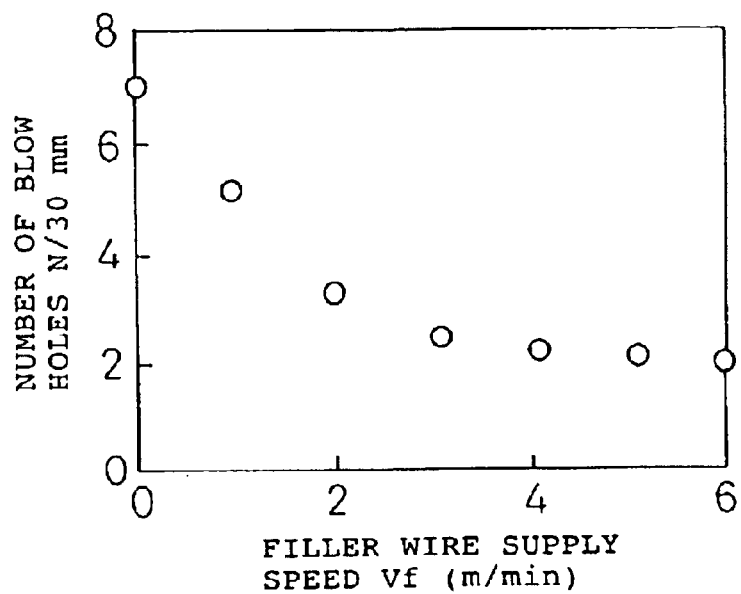
FIG. 20 is a graph showing the relationship between a filler supply speed and a number of blow holes generated.

Next, the filler wire supply speed will be explained. FIG. 19 shows the relationship between a filler wire supply speed and a variation ratio of the depth of penetration. As shown in FIG. 20, the content of blow holes per unit length of the weld bead decreases as the filler wire supply speed Vf is increased. As explained above, it is understood that formation of blow holes in the weld bead causes an increase in the variation ratio Bd/d. Accordingly, while the depth of penetration is made uniform, formation of blow holes in the weld bead must be prevented. It is evident from FIG. 19 that the variation ratio Bd/d drastically decreases when the filler supply speed Vf is 2 m/min. That is, the deoxidation amount is judged to be sufficient when the filler supply speed Vf is near 2 m/min. Accordingly, it is desirable that the filler supply speed Vf be at least 2 m/min.

When the filler wire is supplied to laser-induced plasma, in front of the laser irradiation portion in the welding direction, a curved nozzle should be used as shown in FIG. 18. In order to conduct welding while the center of the laser-induced plasma is being shifted from the center of the laser beam in the welding direction, the side gas $G_S$ is blown from the side gas nozzle 243 shown in FIG. 18 so that the displacement is controlled by the gas pressure. The displacement is from about 0.5 to 1.5 times as much as a reference plasma diameter which is determined by the laser output and the laser beam diameter, and the type and flow rate of the shield gas.

In order to reduce the load of melting metal by laser, the butt welding method of the invention is also effective for tack welding by laser wherein the welding cross-section necessary for bonding hot steel materials is not entirely but only partly welded by the laser, and the entire cross-section is pressure welded by the following rolling.

EXAMPLE 3

According to the third invention, steel materials at about 1,000° C. were butt-welded by a 45 kW $CO_2$ gas laser while center gas (helium) was being blown. The welding speed V was 3 m/min. A filler wire containing 3% of Ti was employed, and the filler wire supply speed was determined to be 4 m/min. The variation ratio Bd/d was lowered to about 10% from about 20% which was obtained when the welding was conducted without supplying the filler wire. Moreover, neither meltdown of molten metal in the butt welding portion nor lowering of the bonded area ratio was observed.

As explained above, according to the third invention, formation of blow holes in the weld bead is prevented; the depth of penetration in the weld bead portion is made uniform; a bead shape with a flat bottom can be obtained without spiking and excessive penetration. Consequently, a defectless butt weld zone is obtained, and the bonding strength is improved.

The fundamental construction of the apparatus for practicing butt welding according to the fourth invention is the same as the apparatus shown in FIG. 17 having been explained above. However, the apparatus is characterized by the wire supply nozzle.

Figure 21:
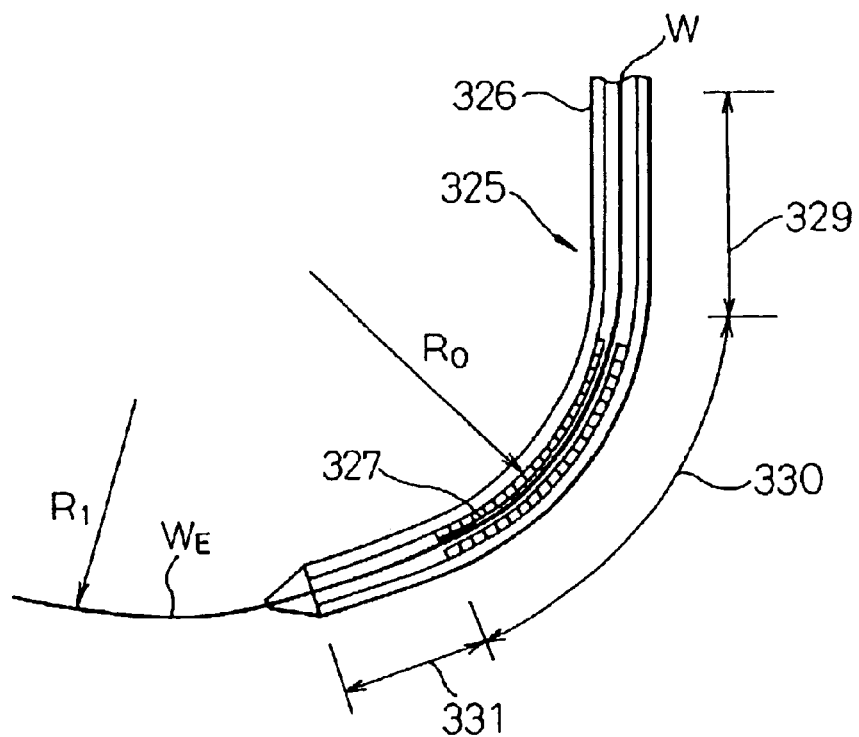
FIG. 21 is a cross-sectional view showing one embodiment of the shape of the front portion in a filler wire supply nozzle according to the fourth invention.

That is, as shown in FIG. 21, the front portion of a wire supply nozzle 325 consists of an inlet side linear portion 329, a curved portion 330 and an outlet side linear portion 331.

The filler wire W supplied from the wire feeder 221 is plastically deformed when it is passed through the wire supply nozzle 325. A projected filler wire (projected portion of wire) $W_E$ from the wire supply nozzle 325 is free from the coiling set, and is substantially linear though it is slightly curved. The projected portion of wire $W_E$ is supplied toward the welding point along the welding line approximately in parallel with the surface of the workpiece S. The radius of curvature $R_0$ of the curved portion 330 of the wire supply nozzle 225 is about 50 to 150 mm. The length of the inlet side linear portion 329 should be at least 10 mm, and an appropriate length of the outlet side linear portion 331 is from about 5 to 20 mm. When such a nozzle having dimensions as explained above is used, the radius of curvature of the projected portion of wire $W_E$ becomes from about 500 to 1,000 mm. Because the projected portion of wire $W_E$ is from about 10 to 50 mm in length, its curvature does not exert adverse effects on the butt welding. In order to prevent abrasion of the curved portion 330 caused by sliding of the filler wire W, the inside diameter of the wire supply nozzle 325 is desirably about the filler wire diameter plus (0.1 to 0.4) mm. Moreover, a wire curvature-straightening tube 327 can also be formed by inserting a plurality of short tubes composed of heat- and abrasion-resistant ceramics into the curved portion 330 of a nozzle main body 326, as shown in FIG. 21. SiC, AlN, $Si_3N_4$, $Al_2O_3$, or the like is used as a material for the wire curvature-straightening tube 327. Use of a ceramic inner wall for the wire supply nozzle 325 can drastically decrease abrasion of the wire supply nozzle 325, increase the resistance to heat of radiation from the hot-rolled sheet bar, and greatly extend the life of the nozzle itself.

Figure 22:
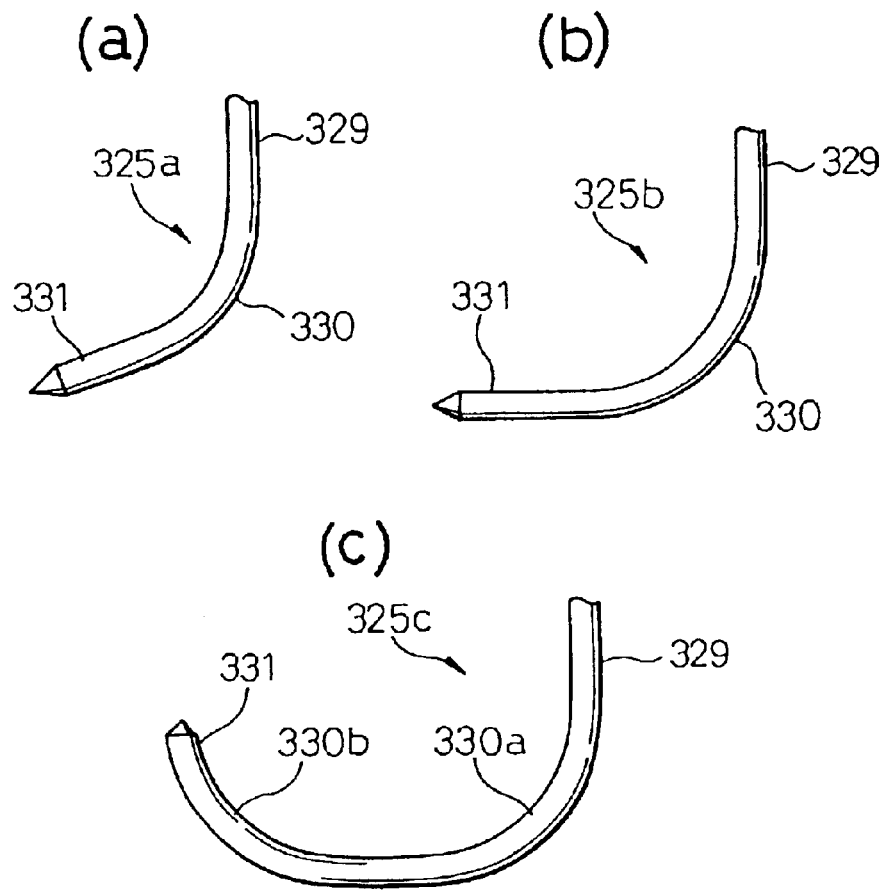
FIGS. 22(*a*), 22(*b*) and 22(*c*) are side views showing various embodiments of the shapes of the front portions of filler wire supply nozzles according to the fourth invention.

FIG. 22 shows wire supply nozzles having various shapes according to the fourth invention. For a wire supply nozzle 325a shown in FIG. 22a, the outlet side linear portion 331 is inclined at an angle of 10 to 45° to the inlet side linear portion 329. For a wire supply nozzle 325b shown in FIG. 22(b), the outlet side linear portion 331 is substantially normal to the inlet side linear portion 329. The wire supply nozzles 325a, 325b are both used when the welding line is horizontal. A wire supply nozzle 325c shown in FIG. 22(c) has two curved portions 330a, 330b, and the outlet side linear portion 331 is substantially parallel to the inlet side linear portion 329. The wire supply nozzle is used when the welding line is vertical.

Figure 23:
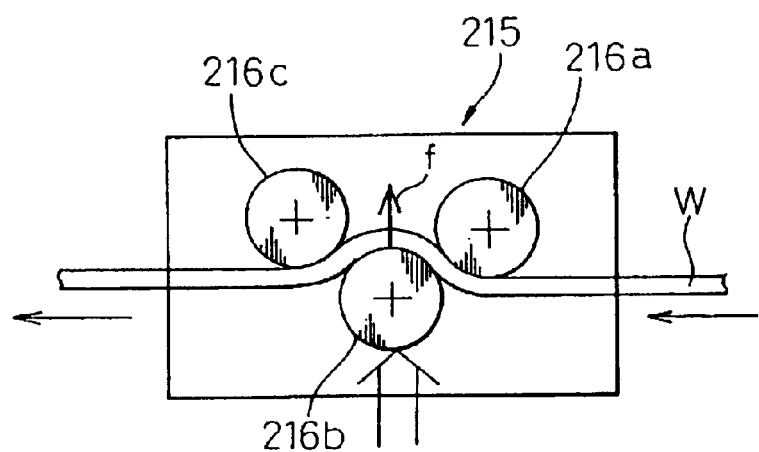
FIG. 23 is a cross-sectional view showing one embodiment of the roller leveler in the laser beam welding apparatus shown in FIG. 17.

The first roller leveler 215 and the second roller leveler 218 shown in FIG. 17 each have 3 or 5 rollers which have a diameter of about 10 to 50 mm and which are arranged at intervals of about 50 to 200 mm. Because the roller shafts of the first roller leveler 215 make an angle of 90° with those of the second roller leveler 218, the two straightening directions of the levelers are shifted from each other to make an angle of 90°, whereby the coiling set of the filler wire W is straightened. FIG. 23 shows the roller leveler 215 which is formed from 3 rollers 216a, 216b, 216c. The straightening load f caused by three-point bending with the 3 rollers 216a, 216b, 216c is from about 1 to 10 kgf.

EXAMPLE 4

An embodiment of the present invention will be explained by taking bonding of hot-rolled sheet bars as an example. FIG. 24 is a schematic side view of an apparatus for bonding sheet bars provided to a hot rolling facility. FIG. 25 is a plan view of FIG. 24. The front end and the tail end of each of the sheet bars S1, S2 were cut off along the width direction by a flying shear 305 to form groove faces. The sheet bars S1, S2 each had a length of 30 m, a width of 1,100 mm and a thickness of 35 mm. Moreover, the sheet bars S1, S2 had a temperature of 1,000° C., and their transfer speed was 90 m/min. The time from shearing to the start of welding was about 20 sec, and the thickness of the scales thus formed on the welding surface was about 50 $\mu$m. The tail end face of the preceding sheet bar S1 and the front end face of the following sheet bar S2 were then butted with each other, and the butt portion 305 was welded by moving a welding head 339 along the butt portion 305, thereby forming a weld bead 307. The laser was a $CO_2$ gas laser having a stationary output of 45 kW. The working speed was 10 m/min. Although a laser oscillator 335 was fixed, the welding head 339 and a wire supply nozzle and a plasma control nozzle were moved in synchronization with the transfer of the sheet bars S1, S2.

As shown in FIG. 17, the filler wire W was accommodated within the pail pack 211, and pulled out through the conduit 213 by the wire feeder 221. The filler wire W was then pushed to the wire supply nozzle 225 (325 in FIG. 22) through the conduit 213, and guided to the welding point. Straightening the coiling set by the roller levelers 215, 218 was not conducted. As shown in FIG. 17, the filler wire W was supplied from the lower part in the welding proceeding direction, and the gas for controlling the laser plasma was blown from the upper part therein.

The radius of curvature of the curved portion of the wire supply nozzle was 50 mm. The clearance between the sheet bar and the shield gas nozzle, the plasma control gas nozzle or the wire supply nozzle was 15 mm. The filler wire supply direction made an angle of 30° with the sheet bar surface, and was on a butt plane. The supply position was 1.5 mm above the laser beam irradiation position, and the supply speed was 5 m/min. Table 1 shows the composition of the filler wire. The filler wire had a diameter of 1.6 mm.

TABLE 1

| C | Si | Mn | Al | Ti |
|---|----|----|----|----|
| 0.10 | 0.45 | 1.12 | 0.15 | 0.15 |

Furthermore, the materials of the wire supply nozzle were as follows: the outer tube was made of brass; the inner wall was made of SiC; the front tip portion was made of copper and plated with gold.

FIG. 26 and Table 2 show the results of measuring shift amounts of wire supply nozzles.

TABLE 2

|  | y-Direction | z-Direction |
|---|---|---|
| Straight nozzle | ±1.0 | ±1.5 |
| Curved nozzle | ±0.2 | ±0.2 |

When the filler wire supply nozzle of the invention was used, the accuracy of the filler wire supply position was ±1.0 mm in the proceeding direction of the sheet bar, and ±0.5 mm in the optical axis direction of the laser beam. Substantial defects in the weld zone were not observed. In contrast, when a filler wire was supplied by the conventional straight filler wire supply nozzle, the accuracy of the filler wire supply position was ±1.5 mm in the proceeding direction of the sheet bar, and ±1.0 mm in the optical axis direction of the laser beam. An offset of the filler wire was produced during laser welding, and no penetration was observed at two or three sites in one welding line. The welded depth varied in the weld zone, and many blow holes were generated to form weld defects.

Furthermore, comparison of the abrasion caused by friction between the filler wire and the nozzle as a function of nozzle materials shows that the life of the wire supply nozzle was one month when the nozzle was entirely made of brass, whereas the life was extended to about one year when the nozzle inner wall was made of SiC.

EXAMPLE 5

Although the dimensions, the material, the transfer speed, the temperature, the welding speed, and the like of the sheet bars were the same as in Example 4, the coiling set of the filler wire was straightened at a straightening load of 5.0 $kgf/cm^2$ in the roller levelers 215, 216 shown in FIG. 17. The radius of curvature of the curved portion of the wire supply nozzle was 50 mm, and the clearance between the workpiece, and the assist gas nozzle, the plasma control gas nozzle or the wire supply nozzle was 10 mm. The supply direction of the filler wire made an angle of 25° with the sheet bar surface, and was on the butt plane. The filler wire supply position was 1.5 mm above the laser beam irradiation position, and the filler wire supply speed was 5 m/min. The filler wire diameter was 1.6 mm.

Table 3 shows the results of measuring the amounts of shift from the target position of the filler wires.

TABLE 3

|  | y-Direction | z-Direction |
|---|---|---|
| Without straightening | ±1.5 | ±0.7 |
| With straightening | ±0.2 | ±0.2 |

Furthermore, when the roller levelers were used, the accuracy of the filler wire supply position at the welding point was ±0.5 mm in the proceeding direction of the sheet bar, and ±0.5 mm in the optical axis direction of the laser beam. As explained above, the positional shift of the filler wire supply was drastically decreased during welding, and formation of blow holes was suppressed in the weld zone. In contrast, when the roller levelers were not used, the accuracy of the filler wire supply position was ±1.0 mm in the proceeding direction of the sheet bar, and ±1.0 mm in the optical axis direction of the laser beam.

In the present invention, the positional shift of the filler wire supply can be drastically decreased during welding, and formation of blow holes can be suppressed in the weld zone. The bonding strength can therefore be ensured sufficiently. As a result, fracture at the joint of the preceding material and the following material does not take place during rolling.

According to the fourth invention, in butt welding by a laser beam, a filler wire can be stably supplied to the butt portion with high accuracy. Accordingly, a butt weld zone of high quality without weld defects can be obtained.

INDUSTRIAL APPLICABILITY

According to the present invention, in butt-welding hot-rolled steel materials, etc. by a laser beam, the depth of penetration of the weld bead portion can be made uniform, and a bead shape with a flat bottom can be obtained without spiking and meltdown. Moreover, in butt-welding of hot-rolled steel materials such as metal strips by a laser beam, the filler wire can be stably supplied to the butt portion with high accuracy.

What is claimed is:

1. A method of butt-welding hot-rolled bars by a laser beam, the method comprising conducting laser welding while a filler wire of an iron series base material, containing from 0.05 to 3% of one or at least two elements selected from aluminum, silicon, titanium and manganese, is being supplied to the welding portion.

2. The method of butt-welding hot-rolled steel materials according to claim 1, wherein the filler wire is supplied to laser-induced plasma in front of the laser beam irradiation portion, in the welding direction.

3. The method of butt-welding hot-rolled steel materials according to claim 1, wherein welding is conducted while the center of the laser-induced plasma is being shifted from the laser team optical axis, in the welding direction.

4. A method of butt-welding hot-rolled steel materials by a laser beam by blowing canter gas against a welding portion symmetrically to the optical aids of the laser beam while side gas is being blown thereagainst from the side, the method comprising:

conducting laser welding while a filler wire of an iron series base material, containing from 0.05 to 3% of one or at least two elements selected from aluminum, silicon, titanium and manganese, is being supplied to the welding portion; and further conducting welding while the center of laser-induced plasma is shifted in the welding direction from the center of the laser beaus by a distance 0.2 to 0.5 times as much as a reference plasma diameter determined from the laser output and the beam diameter, and the type and flow rate of the center gas.

5. The method of butt-welding hot-rolled steel materials according to claim 4, wherein the filler wire is supplied to laser-induced plasma in front of the laser beam irradiation portion, in the welding direction.

* * * * *